US008576437B2

(12) United States Patent
Haruyama et al.

(10) Patent No.: US 8,576,437 B2

(45) Date of Patent: Nov. 5, 2013

(54) IMAGE FORMING APPARATUS AND METHOD FOR PRINTING VARIABLE CONTENTS AND ATTRIBUTES ASSOCIATED THEREWITH

(75) Inventors: Mikita Haruyama, Yokohoma (JP); Kenji Ogasawara, Kawaguchi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 841 days.

(21) Appl. No.: 12/267,810

(22) Filed: Nov. 10, 2008

(65) Prior Publication Data

US 2009/0145811 A1 Jun. 11, 2009

(30) Foreign Application Priority Data

Nov. 15, 2007 (JP) ................................ 2007-296701

(51) Int. Cl.
*G06K 15/00* (2006.01)

(52) U.S. Cl.
USPC ........................................................ 358/1.18

(58) Field of Classification Search
USPC ........................... 358/1.1, 1.15, 1.18; 400/24
See application file for complete search history.

(56) References Cited

U.S. PATENT DOCUMENTS

2007/0154250 A1* 7/2007 Cahill et al. .................... 400/24

FOREIGN PATENT DOCUMENTS

| | | | |
|---|---|---|---|
| JP | 05-064925 | | 3/1993 |
| JP | 5064925 | * | 3/1993 |
| JP | 2000-022935 | A | 1/2000 |
| JP | 2000-255885 | * | 9/2000 |

OTHER PUBLICATIONS

Notification of Reason for Refusal in JP 2007-296701 dated Jun. 9, 2009, and an English Translation thereof.

* cited by examiner

*Primary Examiner* — Jeremiah Bryar

(74) *Attorney, Agent, or Firm* — Buchanan Ingersoll & Rooney PC

(57) ABSTRACT

Disclosed is printing a character forming image in an end part of each sheet of a plurality of sheets of paper which are to be sorted by an attribute, in an order of slicing a character which expresses the attribute of each sheet, based on what number sheet of paper is each sheet among a paper group which is sorted by the same attribute, the character forming image being obtained by sequentially slicing the character in a previously determined direction at a previously determined interval.

15 Claims, 23 Drawing Sheets

*FIG.3*

91

| ATTRIBUTE CODE | DISPLAY COLOR | DISPLAY CHARACTER STRING |
| --- | --- | --- |
| 1 | BLUE | 東京 (MEANING TOKYO) |
| 2 | WHITE | 大阪 (MEANING OSAKA) |

FIG. 4

92

| PROCESSING PAGE | ATTRIBUTE CODE |
|---|---|
| 1 | 1 |
| 2 | 2 |
| 3 | 2 |
| 4 | 1 |
| ⋮ | ⋮ |

FIG. 15

93

| SORTING OBJECT | ATTRIBUTE CODE | DISPLAY COLOR | DISPLAY CHARACTER STRING |
|---|---|---|---|
| SORTING OBJECT 1 (CUSTOMER IMPORTANCE) | 1 | RED | 最重要顧客 (MEANING MOST IMPORTANT CUSTOMER) |
| | 2 | GREEN | 重要顧客 (MEANING IMPORTANT CUSTOMER) |
| | 3 | WHITE | 通常顧客 (MEANING ORDINARY CUSTOMER) |
| SORTING OBJECT 2 (DELIVERY DESTINATION) | 1 | BLUE | 東京 (MEANING TOKYO) |
| | 2 | WHITE | 大阪 (MEANING OSAKA) |
| SORTING OBJECT 3 (SEX) | 1 | YELLOW | 男性 (MEANING MALE) |
| | 2 | WHITE | 女性 (MEANING FEMALE) |

FIG. 16

94

| PROCESSING PAGE | SORTING OBJECT | ATTRIBUTE CODE |
|---|---|---|
| 1 | SORTING OBJECT 1 (CUSTOMER IMPORTANCE) | 2 |
| | SORTING OBJECT 2 (DELIVERY DESTINATION) | 1 |
| | SORTING OBJECT 3 (SEX) | 2 |
| 2 | SORTING OBJECT 1 (CUSTOMER IMPORTANCE) | 3 |
| | SORTING OBJECT 2 (DELIVERY DESTINATION) | 2 |
| | SORTING OBJECT 3 (SEX) | 1 |
| ⋮ | ⋮ | ⋮ |

IMAGE FORMING APPARATUS AND METHOD FOR PRINTING VARIABLE CONTENTS AND ATTRIBUTES ASSOCIATED THEREWITH

BACKGROUND OF THE INVENTION

1. Field of the Invention

The present invention relates to an image forming method and an image forming apparatus.

2. Description of Related Art

In recent years, variable printing has become widely used in a print on demand (POD) field. When sorting is performed in accordance with the delivery destinations and delivery methods of printed matter, and the classification and levels of customers, it is possible to perform the sorting by the number of sheets of paper simply in accordance with the classification when the printed matter includes only the same image like the printed matter of offset printing. However, it is necessary for the variable printing to perform the sorting in accordance with the content (part having the possibility of changing in each piece of the printed matter) of the printed matter because the contents of all pages can be different from one another basically.

For example, there is a case of sorting sheets of paper addressed to the customers living in the Tokyo district and sheets of paper addressed to the customers living in the Osaka district. Moreover, there is a case of sending catalogs having different contents according to the degree of importance of customers at the time of sending out direct mail as follows: enclosing a free invitation card of an event and a discount ticket with a catalog to each of the most important customers, enclosing a discount ticket with a catalog to each of important customers, and sending only a catalog to each of ordinary customers. Alternatively, there can be a case of sending a discount ticket of shopping to each of female customers, and of sending an invitation card of an amusement park to each of the customers each having a family.

In order to perform such sorting, there are a method of performing printing in the order according to sorting, and a method of performing sorting by printing additional information, such as a bar code, in a margin of printed matter in advance, and scanning the additional information to compare the scanned data with data in a database. Moreover, it is also possible to show the use application of a paper bundle by placing a cover page on which the use application of the paper bundle is entered on the paper bundle after sorting.

Moreover, a technique to make it easy to perform sorting by entering a character string in a delimited tab has been proposed for an image forming apparatus to divide one side of a sheet of paper into a plurality of regions, and to print delimited tabs for sorting to each of the divided regions (see Japanese Patent Application Laid-Open Publication No. 2000-22935).

However, the method of performing printing in the order according with sorting has a problem of not being able to perform complicated variable printing. Moreover, the method of scanning additional information requires comparatively large scale system architecture for interlocking a scanning mechanism with the database, and it is difficult for a user of a business scale of performing the conventional simple sorting to introduce the method owing to its cost. Moreover, the method of placing a cover page on which a use application is entered has the problem of not being able to judge the use application when the cover page has been lost or when the cover page is replaced.

Moreover, in all of the cases, there was a possibility that sorted sheets of paper are used for another use application by mistake such as a case where a paper group of a customer A is put in an envelope of a customer B.

SUMMARY OF THE INVENTION

The present invention has been made in view of the above described problems in the conventional art, and it is an object of the present invention to enable the easy judging of the attribute of sheets of paper when the sheets of paper are sorted.

To achieve the above object, an image forming method reflecting one aspect of the present invention, comprises:

printing a character forming image in an end part of each sheet of a plurality of sheets of paper which are to be sorted by an attribute, in an order of slicing a character which expresses the attribute of each sheet, based on what number sheet of paper is each sheet among a paper group which is sorted by the same attribute, the character forming image being obtained by sequentially slicing the character in a previously determined direction at a previously determined interval.

Preferably, in the image forming method, the previously determined interval corresponds to a thickness of one or a plurality of sheets of paper.

Preferably, the image forming method further comprises:

printing an identification image of a color corresponding to the attribute of each sheet in the end part of each sheet at a position which differs from where the character forming image is printed.

Preferably, the image forming method further comprises:

previously setting a plurality of attributes each corresponding to a sorting object for each sheet; and printing a plurality of character forming images corresponding to each attribute among the plurality of attributes, in the end part of each sheet at positions which differ from each other.

BRIEF DESCRIPTION OF THE DRAWINGS

The present invention will be more completely understood from the following detailed descriptions of the embodiments and the attached drawings. However, these embodiments and the drawings are not intended to limit the scope of the present invention, wherein:

FIG. 3 is a diagram showing the data configuration of a sorting correspondence table;

FIG. 4 is a diagram showing the data configuration of sorting information;

FIG. 15 is a diagram showing the data configuration of a sorting correspondence table;

FIG. 16 is a diagram showing the data configuration of sorting information;

DETAILED DESCRIPTION OF THE PREFERRED EMBODIMENTS

[First Embodiment]

In the following, a first embodiment of an image forming apparatus according to the present invention will be described with reference to the attached drawings.

Figure 1:
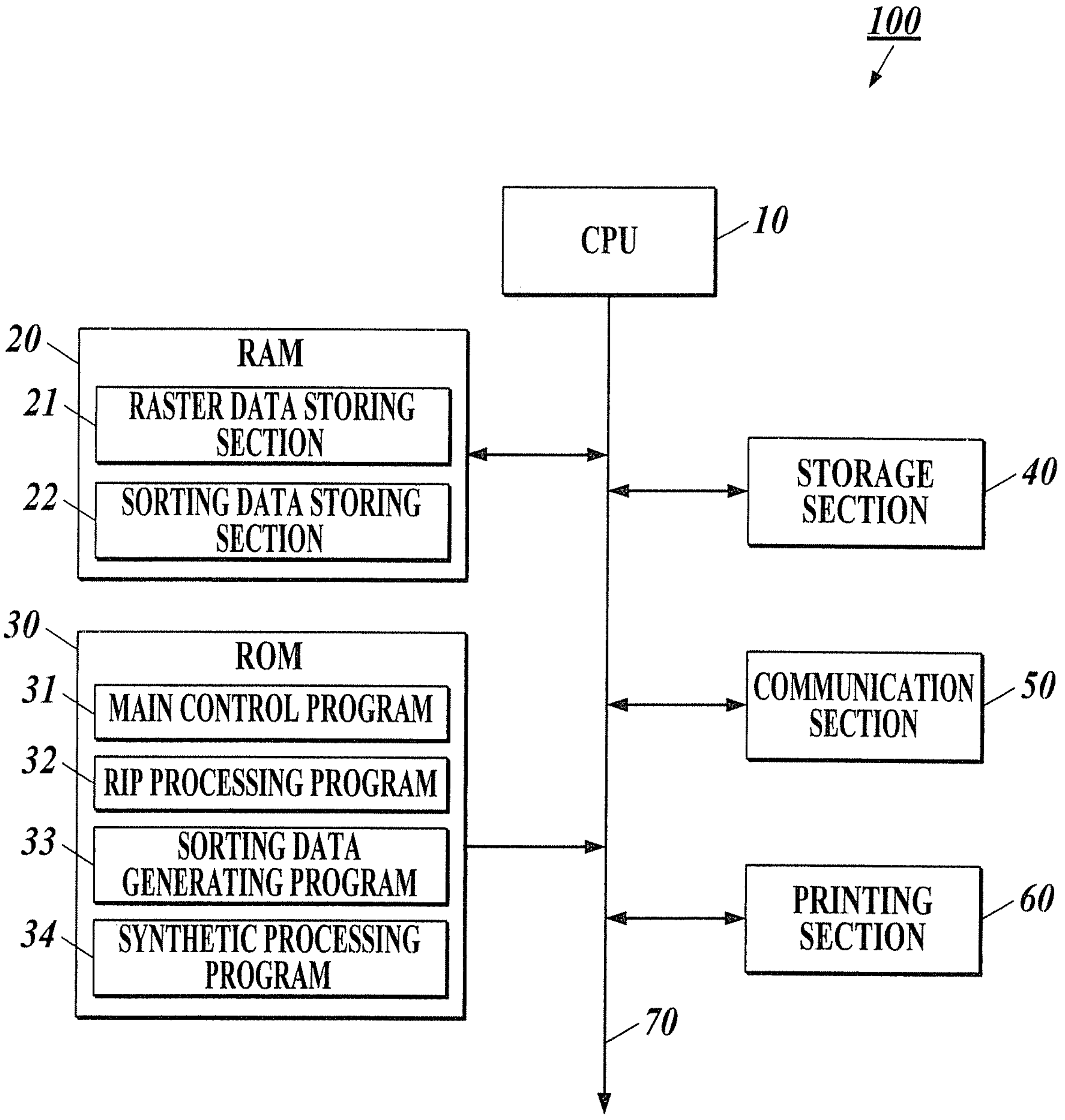
FIG. 1 is a block diagram showing the functional configuration of an image forming apparatus of a first embodiment of the present invention.

FIG. 1 shows the functional configuration of the image forming apparatus 100 of the first embodiment of the present invention.

As shown in FIG. 1, the image forming apparatus 100 includes a central processing unit (CPU) 10, a random access memory (RAM) 20, a read only memory (ROM) 30, a storage section 40, a communication section 50, and a printing section 60, and each section is connected to one another through a bus 70.

Figure 2:
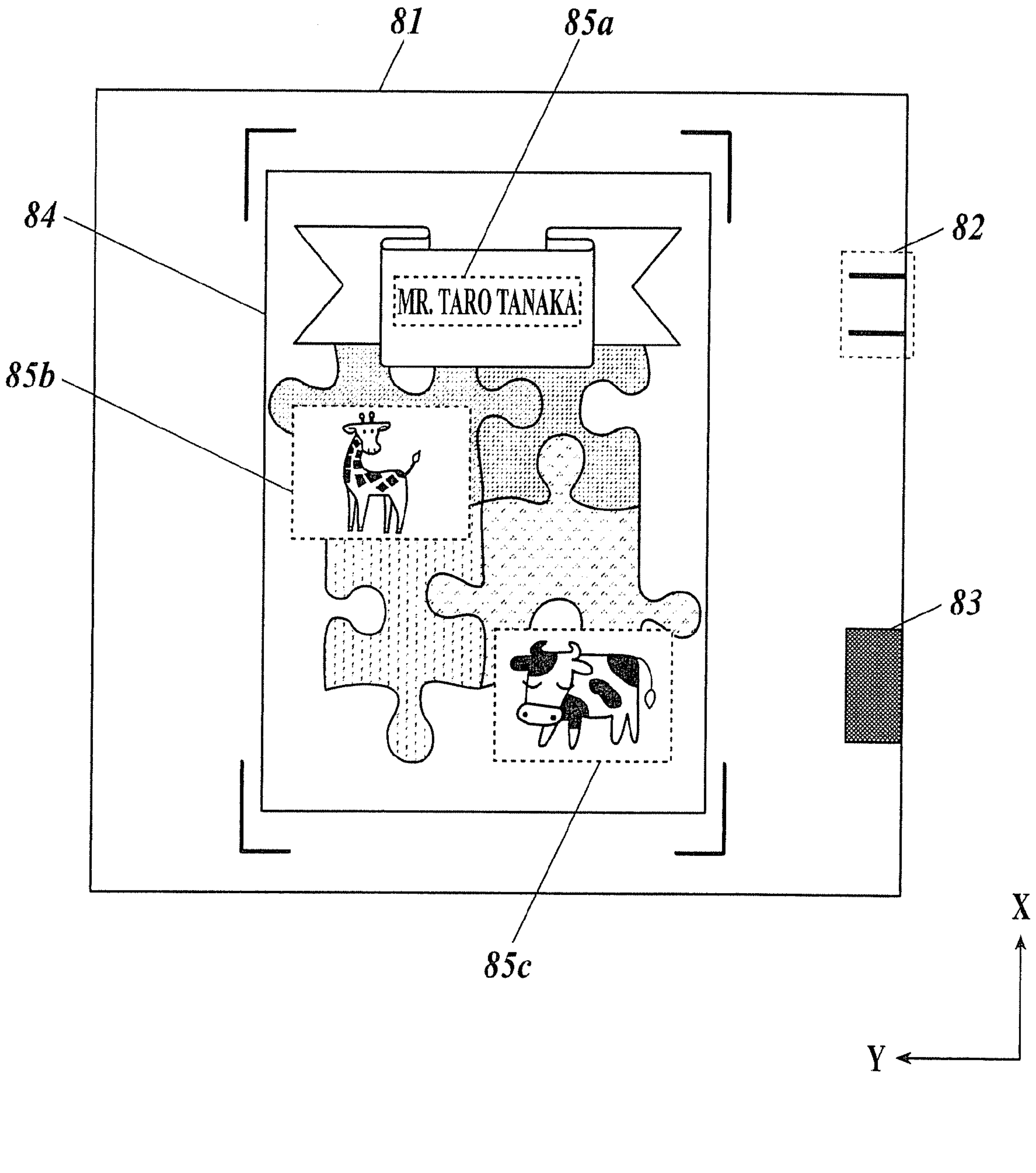
FIG. 2 is a view showing an example of an image printed by the image forming apparatus.

As shown in FIG. 2, the image forming apparatus 100 synthesizes a printing image 81, a character forming image 82, and an identification image 83 together, and performs the printing output of the synthesized image. The printing image 81 is an image which has the possibility of having different contents thereof every page, and includes a form 84 which is a common part of variable printing, and pieces of content 85*a*, 85*b*, and 85*c* which are variable parts of variable printing. The character forming image 82 forms characters indicating the attribute of a paper bundle which is sorted by every attribute, on the side face of the paper bundle when a plurality of sheets of paper are sorted by laying a sheet of paper on the top of the other sheets of paper in the order of printing according to the attribute of each sheet of paper. The attribute of a sheet of paper is the information indicating which group the sheet of paper belongs to when a plurality of sheets of paper is sorted according to a certain sorting object. The identification image 83 displays a color corresponding to the attribute of each sheet of paper.

In the first embodiment, a description is given to the case where a "delivery destination" is adopted as a sorting object and "東京 (meaning Tokyo)" and "大阪 (meaning Osaka)" are used as the attributes of respective sheets of paper.

The CPU 10 reads various processing programs stored in the ROM 30 according to instruction signals received by the communication section 50, and collectively controls the processing operations of each section of the image forming apparatus 100 in cooperation with the read programs.

As the programs stored in the ROM 30, a main control program 31, a raster image processor (RIP) processing program 32, a sorting data generating program 33, a synthetic processing program 34, and the like, are given.

To put it concretely, the CPU 10 collectively controls the processing operations to be executed in the image forming apparatus 100 in cooperation with the main control program 31.

The CPU 10 performs a rasterizing process for expanding the printing image 81 to raster data in cooperation with the RIP processing program 32. The raster data of the printing image 81 generated by the rasterizing process is stored in a raster data storing section 21 in the RAM 20.

The CPU 10 performs a sorting data generating process A (see FIG. 8) for generating the raster data of the character forming image 82 and the identification image 83 (hereinafter referred to as sorting data) in cooperation with the sorting data generating program 33. The sorting data generated by the sorting data generating process A is stored in a sorting data storing section 22 of the RAM 20.

The CPU 10 synthesizes the pieces of raster data of the images to be synthesized together in cooperation with the synthetic processing program 34. To put it concretely, the CPU 10 synthesizes the raster data of the printing image 81 and the sorting data.

The RAM 20 forms a work area for temporarily storing various processing programs to be executed by the CPU 10 and the data pertaining to programs. The RAM 20 includes the raster data storing section 21 and the sorting data storing section 22.

The storage section 40 is a storage unit, such as a hard disk, for storing various kinds of data.

The communication section 50 is a function unit to connect the image forming apparatus 100 with a network, such as a local area network (LAN), to perform data communication with external equipment.

The printing section 60 performs the image formation of an electrophotographic printing system on a sheet of paper, and includes a photosensitive drum, a charging unit to perform the charging of the photosensitive drum, an exposing unit to expose the surface of the photosensitive drum on the basis of image data, a developing unit to adhere toner onto the photosensitive drum, a transfer unit to transfer a toner image formed on the photosensitive drum to a sheet of paper, and a fixing unit to fix the toner image formed on the sheet of paper. Incidentally, the printing section 60 may be the ones of an ink-jet system, a thermal transfer system, or the like.

The image forming apparatus 100 receives a printing job of variable printing from the communication section 50 via a network, and performs the printing output of the printing job with the printing section 60. The printing job includes an ordinary job and a code generating job.

The ordinary job is the data of a plurality of printing images 81 having the possibility that each page has different contents, and includes printer job language (PJL) data and page description language (PDL) data. The ordinary job may include the data of a plurality of pages each including different contents. The ordinary job may include the information pertaining to the common part (form 84) of the variable printing and the information pertaining to the variable parts (pieces of content 85*a*, 85*b*, and 85*c*) of the variable printing, and may generate the data of each page by synthesizing the common part and the variable parts in the image forming apparatus 100.

The code generating job is the information necessary for generating the sorting data, and includes a sorting correspondence table 91 shown in FIG. 3 and sorting information 92 shown in FIG. 4.

The sorting correspondence table 91 associates an attribute code, a display color, and a display character string with one another to the attribute (“東京 (meaning Tokyo)” or “大阪 (meaning Osaka)”) of each sheet of paper as shown in FIG. 3. The attribute code means a numeral associated with each attribute. The display color means a color of the identification image 83 to be printed on each sheet of paper, and the color is previously determined for each attribute. The display character string is the characters formed on a side face of a paper bundle of each attribute by the character forming image 82 to express the attribute when a plurality of sheets of paper after printing is sorted by laying a sheet of paper on the top of the other sheets of paper in the order of printing according to the attribute of each sheet of paper.

The sorting information 92 is the information to associate an attribute code (attribute) to each processing page as shown in FIG. 4. In the example shown in FIG. 4, first to fourth pages are associated to (“東京 (meaning Tokyo),” “大阪 (meaning Osaka),” “大阪 (meaning Osaka),” and “東京 (meaning Tokyo),” respectively.

With respect to each sheet of paper among the plurality of sheets of paper which are to be sorted by their attributes, based on the number of the sheets of paper from the top of the paper group that is to be sorted to the same attribute, the CPU 10 synthesizes the character forming image 82 to a position, at which the characters are to be printed at the end of each sheet of paper of the printing image 81 in the order of slicing, the character forming image 82 being obtained by slicing the characters expressing the attribute of each sheet of paper, sequentially in a previously determined direction at a previously determined interval.

Now, a method of generating the character forming image 82 is described.

Figure 5:
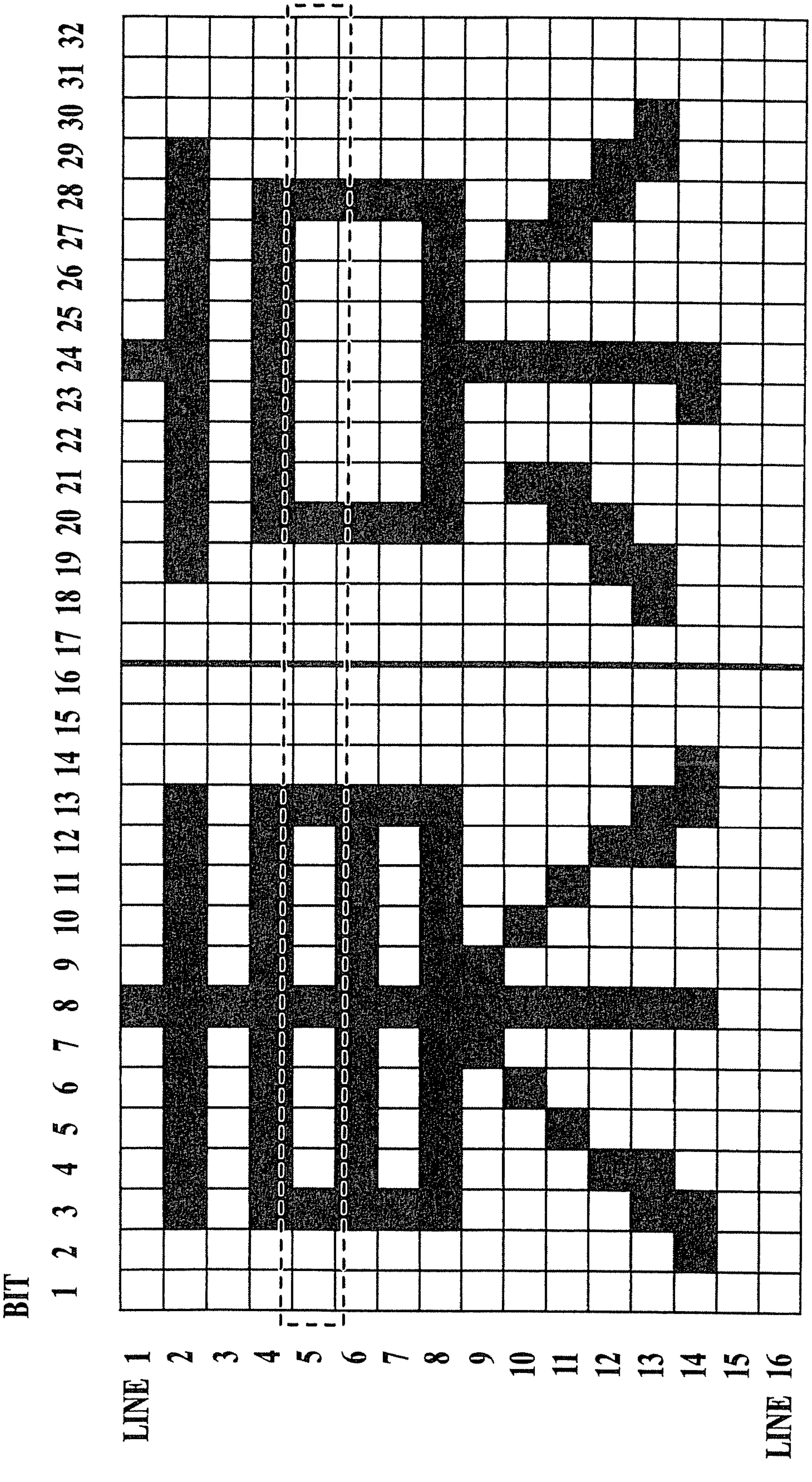
FIG. 5 is a view showing an example of a printing character bit map.

The characters expressing the attribute of a sheet of paper are composed of a bit map of an arbitrary size. FIG. 5 shows an example of a bit map of printing characters each of which is composed of 16 lines×16 bits. In the example shown in FIG. 5, the characters of “東京 (meaning Tokyo)” expressing the attribute are sliced at an interval of one line in the lateral direction of the characters. The data of the bit map of each character may be received together with a printing job, or may be generated on the basis of a “display character string” in the sorting correspondence table 91 at the time of receiving a printing job. Moreover, general font data may be used.

Each line expressed in FIG. 5 is composed of a plurality of sheets of paper on which the same character forming image 82 is printed. A description is given here to a case where one line is composed of 100 sheets of paper and the whole character is composed of 1600 sheets of paper. The printing of the character forming image 82 is not performed on the sheets of page on and after the $1601^{st}$ page, but other characters or drawing patters may be printed there when necessary. Moreover, when there are 3200 pages or more of the sheets of paper of the attribute “東京 (meaning Tokyo),” then the characters of “東京 (meaning Tokyo)” can be printed in a vertical line. Moreover, the number of sheets of paper per line can be changed according to the thickness of each sheet of paper.

The image forming apparatus 100 is provided with page counters each indicating the order of an appeared page for the respective attributes (delivery destinations). The page counter for the attribute “東京 (meaning Tokyo)” is denoted as a page counter 1, and the page counter for the attribute “大阪 (meaning Osaka)” is denoted as a page counter 2. When there are three or more attributes, the number of the page counters is increased by that number. Moreover, the image forming apparatus 100 is provided with line counters in which the counted value is incremented by one every 100 of the counted value of the corresponding page counter. The line counter for the attribute “東京 (meaning Tokyo)” is denoted as a line counter 1, and a line counter for the attribute “大阪 (meaning Osaka)” is denoted as a line counter 2. The value of the line counter 1 or 2 is changed by the value of the page counter 1 or 2, respectively, and which line of the bit string among the printing characters bit map is determined on the basis of the value of the line counter 1 or 2 so as to be printed in the region of the character forming image 82 of each page.

Figure 6A:
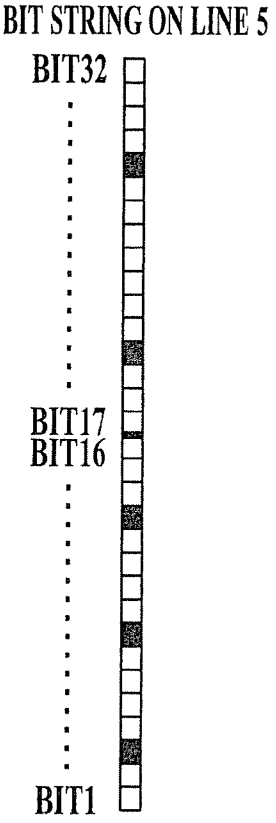
FIG. 6A is a diagram showing an example of a bit string at line 5 of the printing character bit map.
Figure 6B:
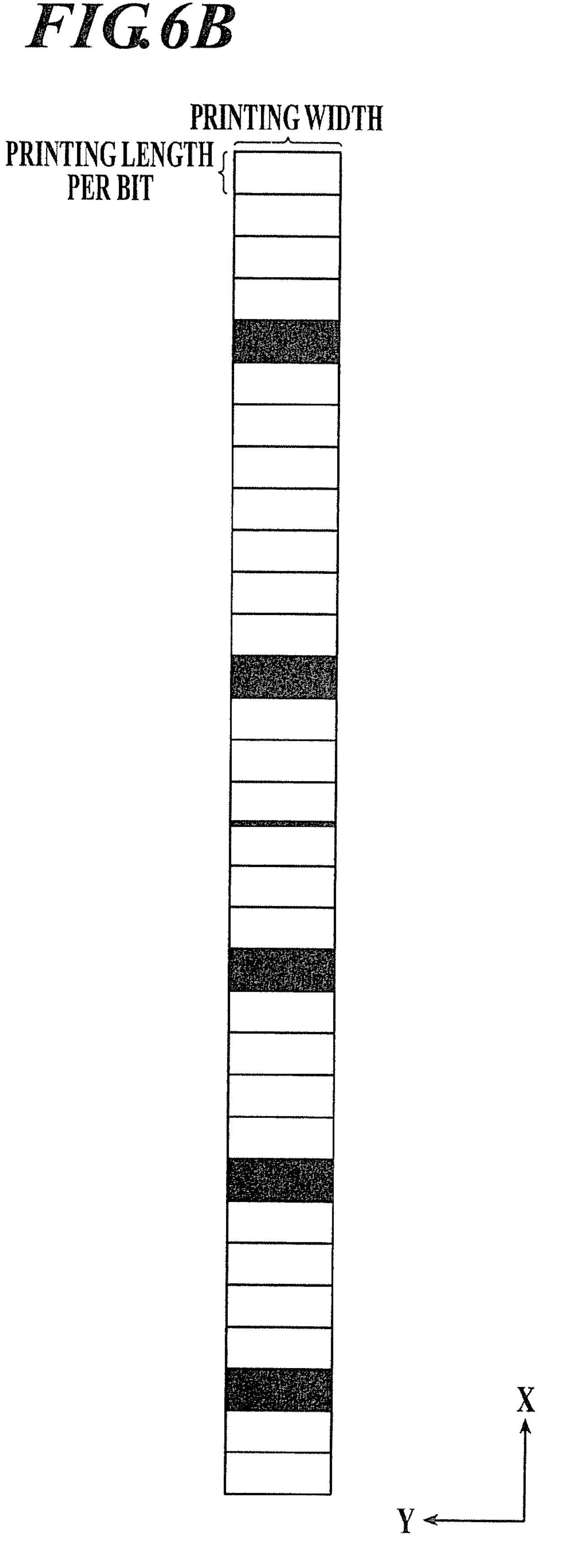
FIG. 6B is a diagram showing an example of the bit string expanded to a printing size.

For example, when object pages are $401^{st}$ to $500^{th}$ pages in a paper group to be sorted to the attribute “東京 (meaning Tokyo),” that is, when the fifth line of the characters of “東京 (meaning Tokyo)” shown in FIG. 5 is to be printed (in the case where the value of the line counter 1 is “5”), the bit string on the line 5 is obtained as shown in FIG. 6A, and the length of each bit in an X direction is expanded to the printing length per bit (for example 5 mm) and the length of each bit in a Y direction is expanded to a printing width (for example, 10 mm) as shown in FIG. 6B to generate the raster data of the printing size. The X and Y directions shown in FIG. 6B correspond to the X and Y directions shown in FIG. 2, respectively. The values of the printing length per bit and printing width can be changed according to the sizes of characters.

Next, the operation of the present embodiment is described.

Figure 7:
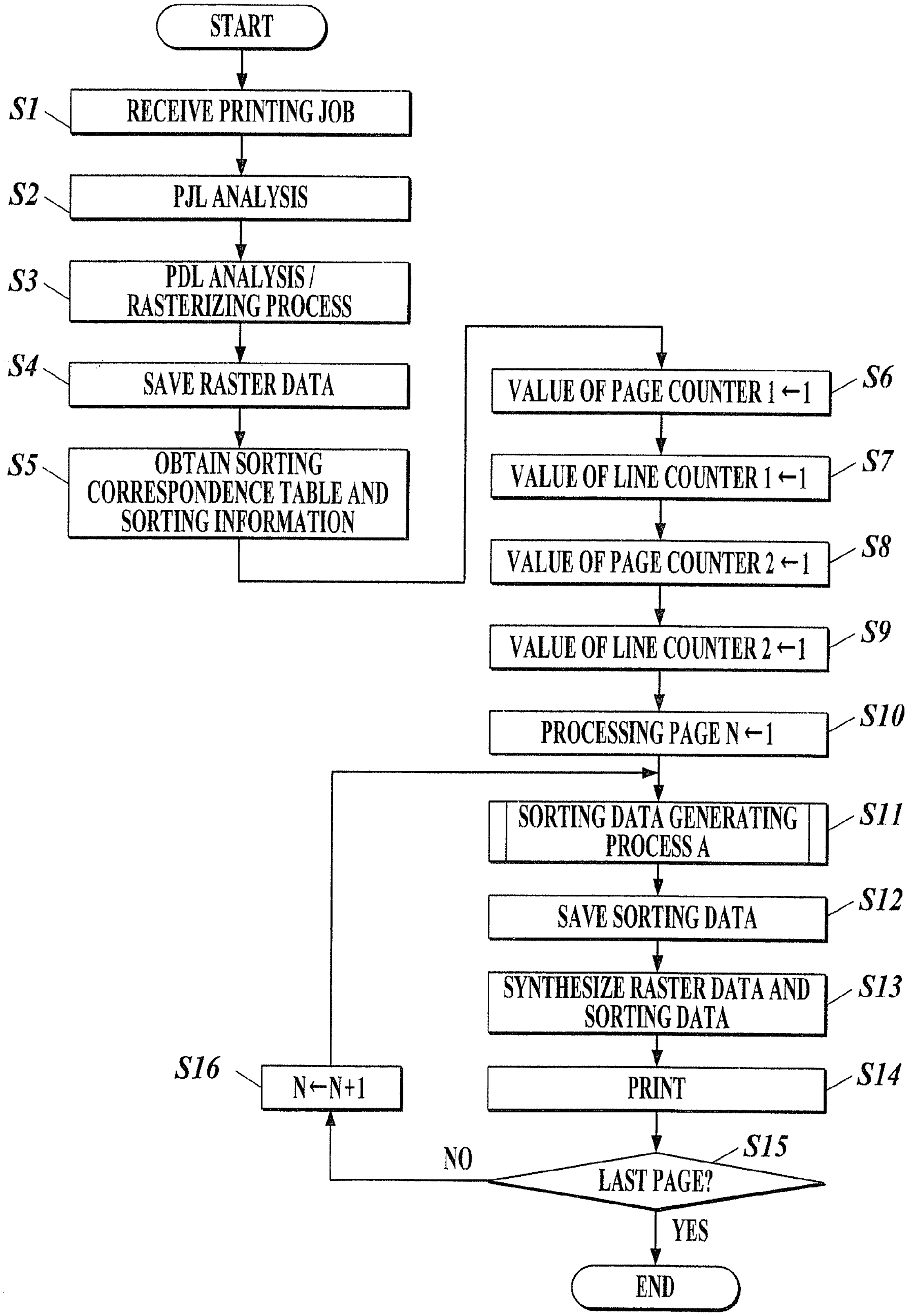
FIG. 7 is a flow chart showing a first variable printing process.

FIG. 7 is a flow chart showing a first variable printing process executed in the image forming apparatus 100. The first variable printing process is realized by a software process in cooperation with the CPU 10 and the programs stored in the ROM 30 (the main control program 31, the RIP processing program 32, the sorting data generating program 33, and the synthetic processing program 34).

First, when the image forming apparatus 100 receives a printing job through a network with the communication section 50 (Step S1), the CPU 10 analyzes the PJL data included in the ordinary job of the printing job (Step S2).

Next, the CPU 10 analyzes the PDL data, and performs the rasterizing process of the PDL data for generating the raster data of the printing image 81 of each page (Step S3). The raster data of the printing image 81 generated by the rasterizing process is saved in the raster data storing section 21 of the RAM 20 by the CPU 10 (Step S4).

Next, the CPU 10 obtains the sorting correspondence table 91 and the sorting information 92 from the code generating job of the printing job received through the network (Step S5).

Next, the CPU 10 initializes the value of the page counter 1, which is the page counter for the attribute "東京 (meaning Tokyo)," to one (Step S6), and initializes the value of the line counter 1, which is the line counter for the attribute "東京 (meaning Tokyo)," to one (Step S7). Next, the CPU 10 initializes the value of the page counter 2, which is the page counter for the attribute "大阪 (meaning Osaka)," to one (Step S8), and initializes the value of the line counter 2, which is the line counter for the attribute "大阪 (meaning Osaka)," to one (Step S9).

Next, the CPU 10 sets a processing page N to one (Step S10), and performs the sorting data generating process A (Step S11).

Figure 8:
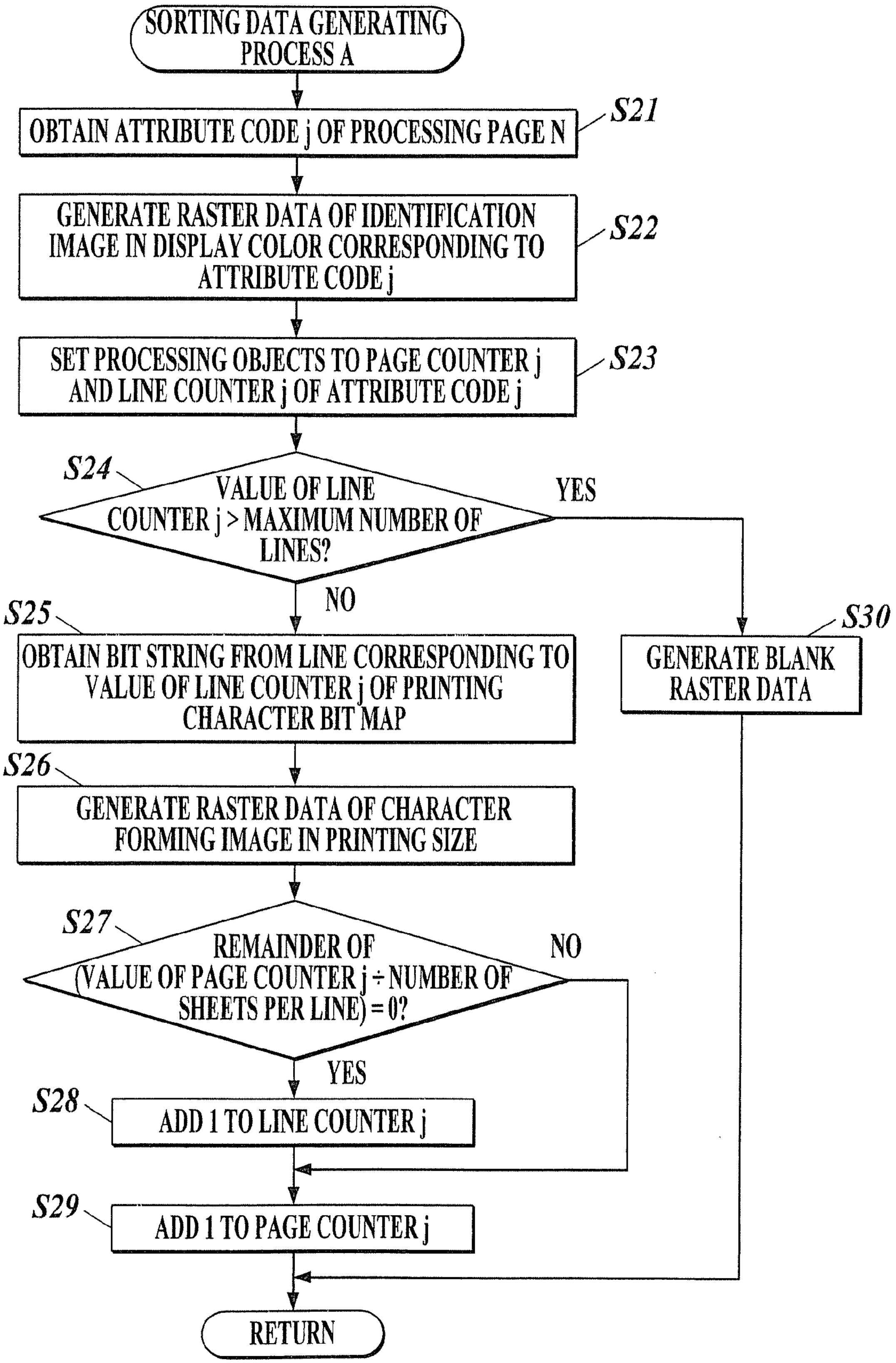
FIG. 8 is a flow chart showing a sorting data generating process A.

The sorting data generating process A is described here with reference to FIG. 8.

First, the CPU 10 obtains the attribute code j of the processing page N from the sorting information 92 (Step S21). The CPU 10 sorts a sheet of paper at the processing page N to the attribute "東京 (meaning Tokyo)" in the case of the attribute code j of "1," and to the attribute "大阪 (meaning Osaka)" in the case of the attribute code j of "2."

Next, the CPU 10 refers to the sorting correspondence table 91 to generate the raster data of the identification image 83 in a display color corresponding to the attribute code j (Step S22).

Next, the CPU 10 sets processing objects as the page counter j and line counter j of the attribute code j (Step S23).

Next, the CPU 10 judges whether the value of the line counter j is larger than the maximum number of lines (16) or not (Step S24). As the result of the judgment, when the value of the line counter j is equal to or less than the maximum number of lines (Step S24: NO), then the CPU 10 obtains bit strings from the line corresponding to the value of the line counter j of the bit map of the printing characters (Step S25), and generates the raster data of the character forming image 82 in the printing size (Step S26).

Next, the CPU 10 judges whether the remainder of the division of the value of the page counter j by the number of sheets per line (100) is zero or not (Step S27). As the result of the judgment, when the remainder of the division of the value of the page counter j by the number of sheets per line is zero (Step S27: YES), that is, when the value of the page counter j can be divided by 100, then the CPU 10 adds one to the value of the line counter j (Step S28).

After the processing at Step S28, or when the remainder of the division of the value of the page counter j by the number of sheets per line is not zero (Step S27: NO), that is, when the value of the page counter j cannot be divided by 100, then the CPU 10 adds one to the value of the page counter j (Step S29).

When the value of the line counter j is larger than the maximum number of lines at Step S24 (Step S24: YES), then the CPU 10 generates the raster data indicating a blank of the region of the character forming image 82 (Step S30).

In this manner, the raster data of the identification image 83 and the raster data of the character forming image 82, or the raster data of the identification image 83 and the raster data of the blank, are generated as sorting data.

After the processing at Step S29 or S30, as shown in FIG. 7, the CPU 10 saves the sorting data generated by the sorting data generating process A in the sorting data storing section 22 (Step S12).

Next, the CPU 10 synthesizes the raster data of the printing image 81 of the processing page N saved in the processing at Step S4 with the sorting data saved in the processing at Step S12 (Step S13). The raster data of the character forming image 82 is synthesized in the position corresponding to the end of each paper of the raster data of the printing image 81, and the raster data of the identification image 83 is synthesized at a position different from the position where the character forming image 82 is printed in the end of each paper of the raster data of the printing image 81. Then, the printing section 60 performs the printing on the basis of the data of the synthesized image (Step S14).

Next, the CPU 10 judges whether the printed page is the last page or not (Step S15). When the printed page is not the last page (Step S15: NO), then the value of the processing page N is incremented by one (Step S16), and the CPU 10 returns the process to Step S11 to perform the process of the next processing page N.

On the other hand, when the printed page is the last page (Step S15: YES), then the CPU 10 ends the first variable printing process.

Figure 9:
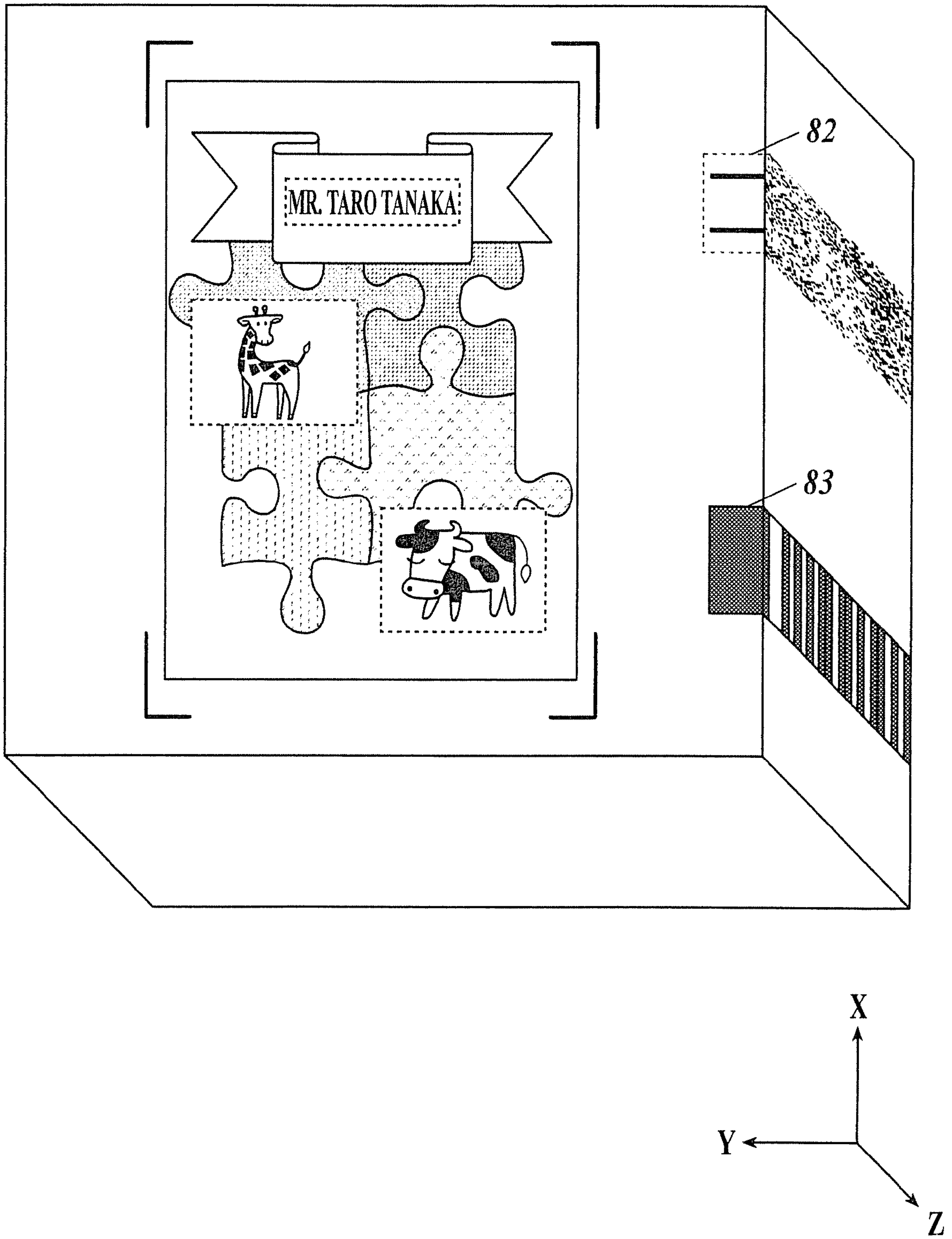
FIG. 9 is a perspective view showing an example of the case where a sheet of paper just after printing is laid on the top of the other sheets of paper in the order of printing.

FIG. 9 shows an example of the case of laying a sheet of paper just after printing on the top of the other sheets of paper in the order of printing in a Z direction. On a side face of the paper bundle, a random pattern is formed by the character forming image 82 printed on each sheet of paper. When each sheet of paper is sorted according to its attribute, a person or a sensor capable of identifying colors performs sorting on the basis of the colors of the identification images 83. To put it concretely, when the color of the identification image 83 of a sheet of paper is "blue," then the sheet of paper is sorted to the attribute "東京 (meaning Tokyo)." When the color of a sheet of paper is "white," then the sheet of paper is sorted to the attribute "大阪 (meaning Osaka)."

Figure 10:
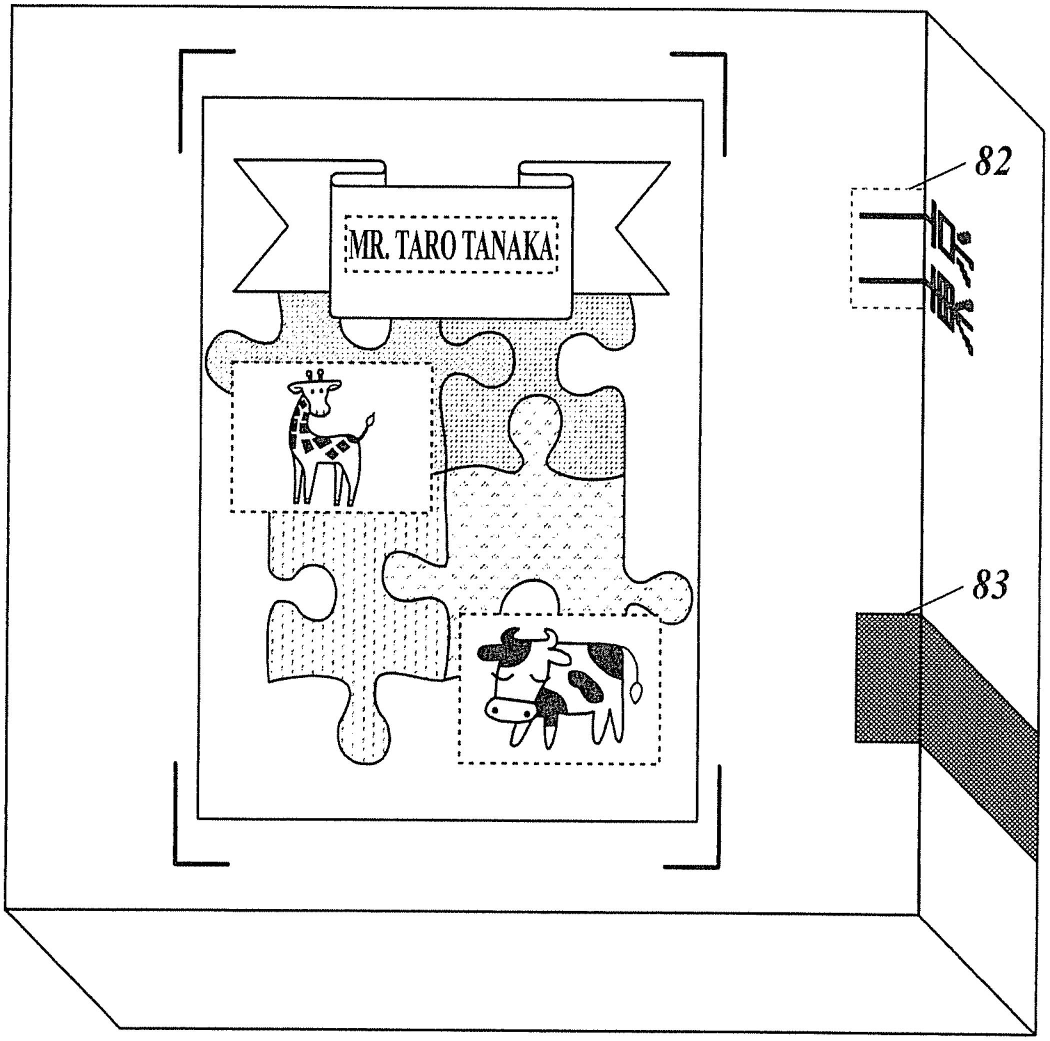
FIG. 10 is a perspective view showing an example of the case of performing sorting by laying a sheet of paper having the attribute of "東京 (meaning Tokyo)" on the top of the other sheets of paper having the attribute of "東京 (meaning Tokyo)" in the order of printing.
Figure 11:
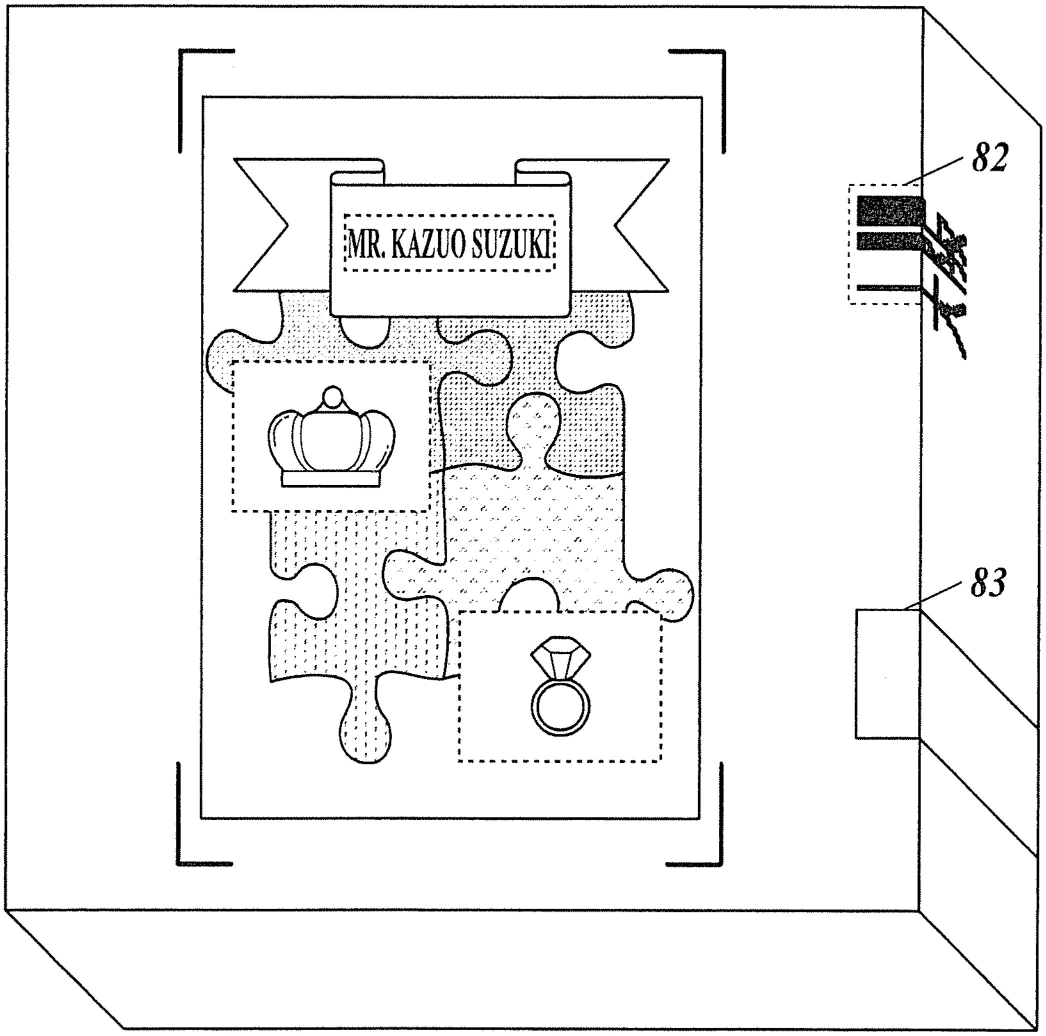
FIG. 11 is a perspective view showing an example of the case of performing sorting by laying a sheet of paper having the attribute of "大阪 (meaning Osaka)" on the top of the other sheets of paper having the attribute of "大阪 (meaning Osaka)" in the order of printing.

FIG. 10 shows an example of the case of performing sorting by laying a sheet of paper of the attribute "東京 (meaning Tokyo)" on the top of the other sheets of paper of the attribute "東京 (meaning Tokyo)" in the order of printing. On a side face of the paper bundle, the characters of "東京 (meaning Tokyo)" are formed by the character forming image 82 printed on each sheet of paper. Moreover, FIG. 11 shows an example of the case of performing sorting by laying a sheet of paper of the attribute "大阪 (meaning Osaka)" on the top of the other sheets of paper of the attribute "大阪 (meaning Osaka)" in the order of printing. On a side face of the paper bundle, the characters of 〝大阪 (meaning Osaka)" are formed by the character forming image 82 printed on each paper.

Figure 12:
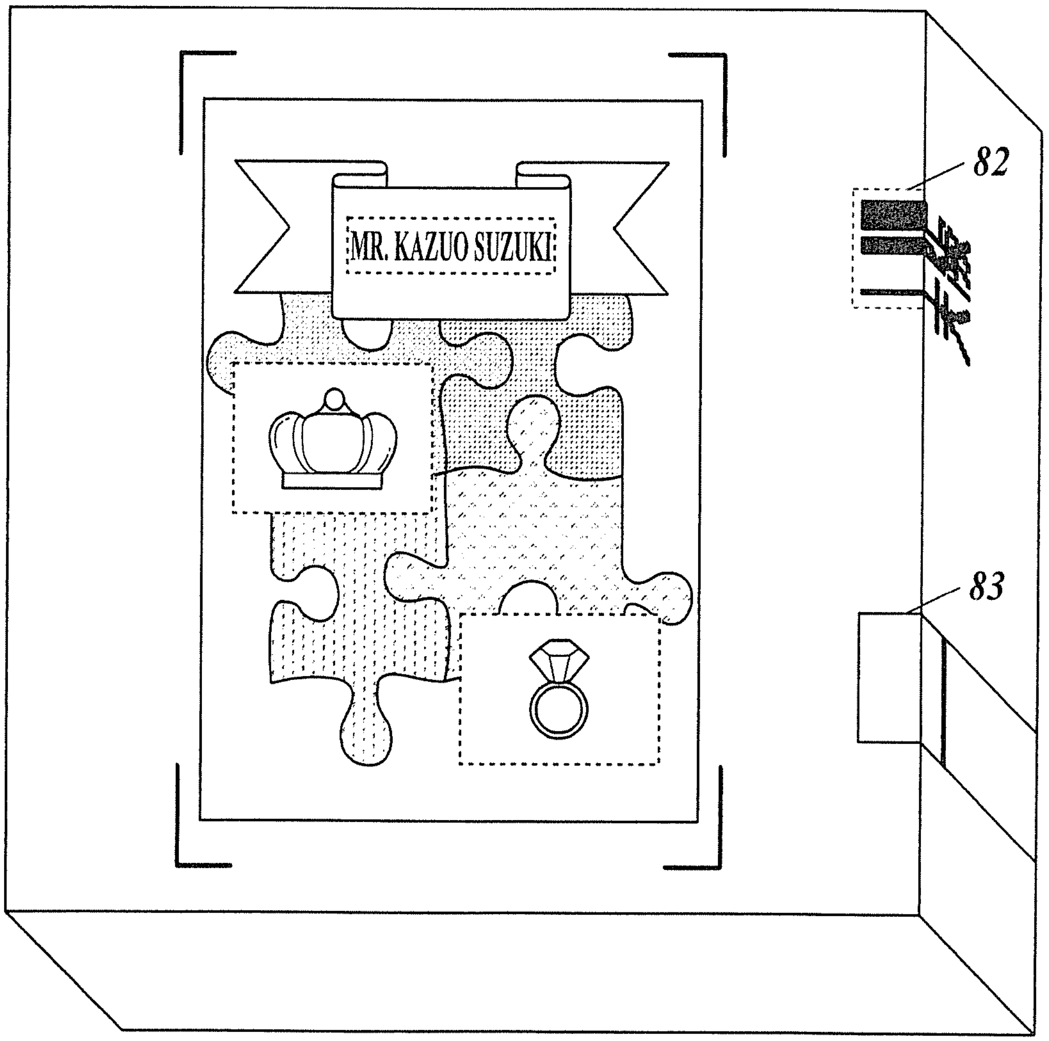
FIG. 12 is a perspective view showing an example of the case where a sheet of paper having the attribute of "東京 (meaning Tokyo)" has entered the paper bundle by mistake, the paper bundle sorted by laying a sheet of paper having the attribute of "大阪 (meaning Osaka)" on the top of the other sheets of paper having the attribute of "大阪 (meaning Osaka)" in the order of printing.

FIG. 12 shows an example of the case where a sheet of paper of the attribute 〝東京 (meaning Tokyo)" entered a paper bundle sorted by laying a sheet of paper of the attribute 〝大阪 (meaning Osaka)" on the top of the other sheets of paper of the attribute 〝大阪 (meaning Osaka)" in the order of printing by mistake. Disorder is caused in the characters of 〝大阪 (meaning Osaka)" formed on a side face of the paper bundle, and it is known that there is a sorting error.

As described above, according to the image forming apparatus 100 of the first embodiment, when sheets of paper is sorted by every attribute, characters expressing the attribute are formed by the character forming image 82 printed on each sheet of paper, on a side face of a paper bundle of each of the sorted attributes, and consequently the attributes of the sheets of paper can be easily judged.

Moreover, in the example of forming one line of a bit map of a printing character of 100 sheets of paper, as described above, characters indicating an attribute can be formed by the thickness of 100 sheets of paper as a unit, when the sheets of paper are sorted by each attribute.

Moreover, since the identification image 83 of the color corresponding to each attribute is printed at the end of each paper, a plurality of sheets of paper can be easily sorted by every attribute on the basis of the colors of the identification images 83.

Moreover, since the characters expressing an attribute are formed by the whole paper bundle sorted by every attribute, even when a part of the paper bundle is lost, the whole characters can be judged when the residual parts exist to a certain degree, and there is the advantage of not losing the information expressing the attribute.

Moreover, since the character forming image 82 is printed in a margin of a sheet which is ordinarily discarded, the use of any tab paper for comparting sheets of paper by every attribute can be avoided, and consequently there is the advantage of reducing costs owing to the saving of the tab paper.

Figure 13:
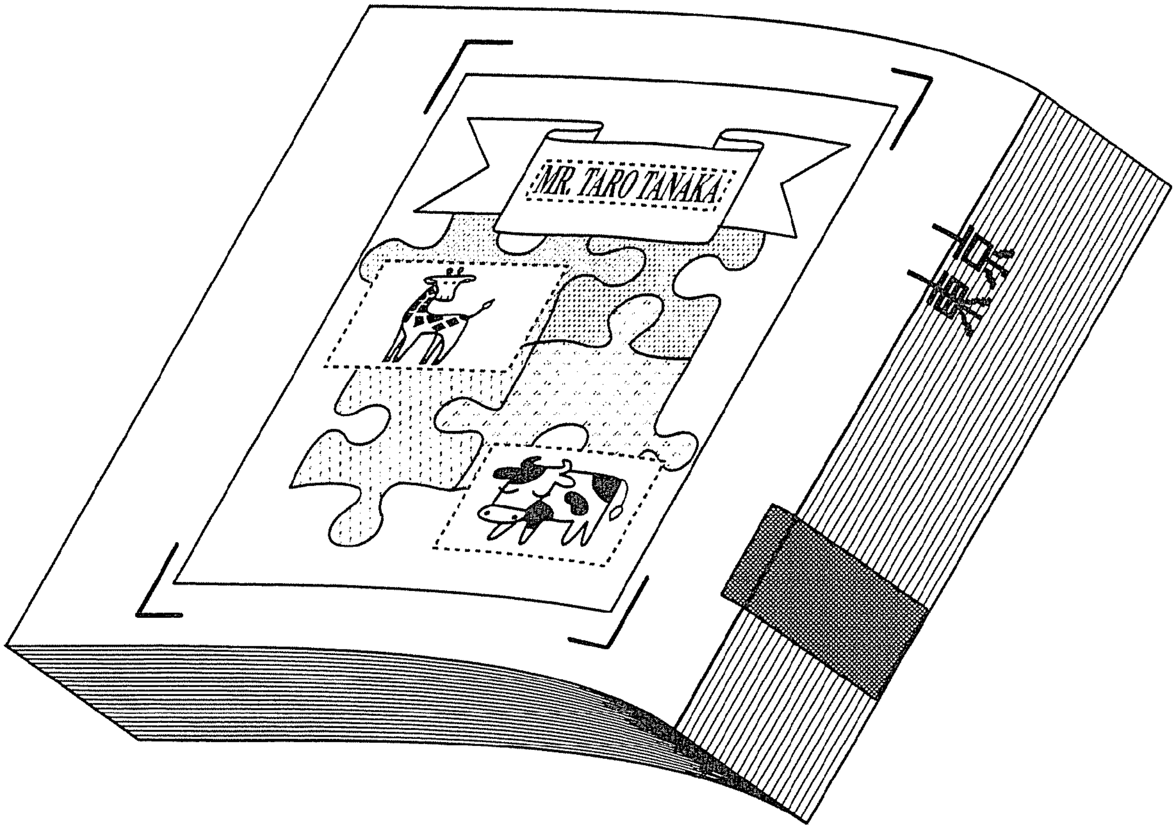
FIG. 13 is a perspective view for illustrating a method of confirming characters by bending the whole paper bundle.

Incidentally, when the characters formed on a side face of a paper bundle cannot be identified in such a case where the thickness of sheets of paper is extremely thin, then the characters may be confirmed by bending the whole paper bundle as shown in FIG. 13.

[Second Embodiment]

Next, a second embodiment of the image forming apparatus according to the present invention will be described.

The second embodiment is an example of the case of generating a plurality of character forming images corresponding to the attribute of each sheet of paper for each of a plurality of sorting objects.

Because the image forming apparatus of the second embodiment has the similar configuration to that of the image forming apparatus 100 shown in the first embodiment, the same components as those of the image forming apparatus 100 are denoted by the same reference numerals as those of the image forming apparatus 100, and the illustrating and descriptions of the configurations of the same components are omitted. In the following, the configurations and processes that are characteristic of the second embodiment are described.

Figure 14:
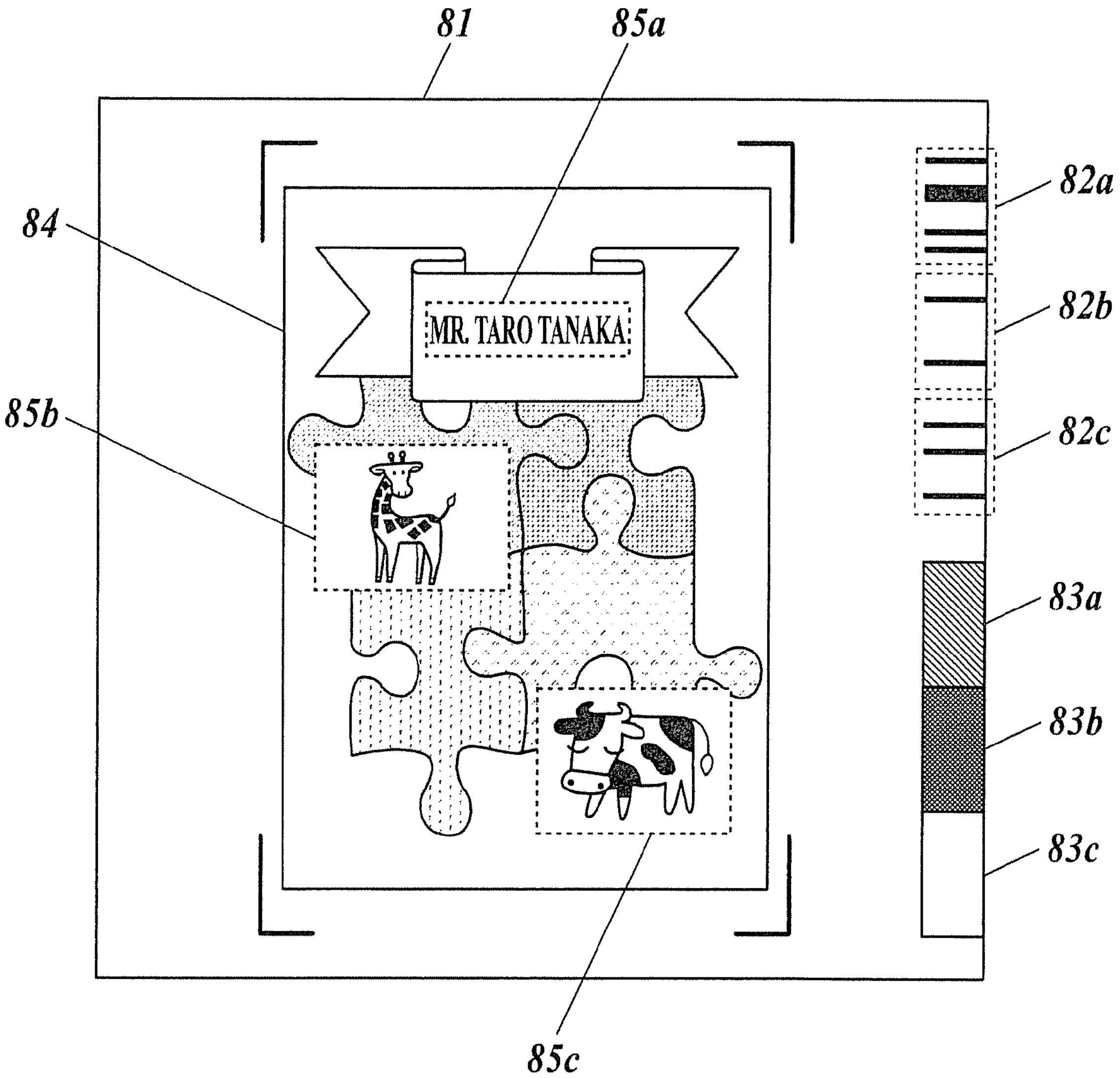
FIG. 14 is a view showing an example of an image printed by an image forming apparatus of a second embodiment.

The image forming apparatus synthesizes the printing image 81, character forming images 82*a*, 82*b*, and 82*c*, and identification images 83*a*, 83*b*, and 83*c* together as shown in FIG. 14, and performs the printing output of the synthesized image. The printing image 81 is an image capable of having different contents to each page, and includes the form 84 which is a common part of variable printing, and pieces of content 85*a*, 85*b*, and 85*c* which are variable parts of the variable printing. The character forming images 82*a*, 82*b*, and 82*c* severally form a character expressing an attribute on a side face of a paper bundle sorted by every attribute in the case of sorting a plurality of sheets of paper by laying a sheet of paper on the top of the other sheets of paper according to the attribute of each sheet of paper in the order of printing. The identification images 83*a*, 83*b*, and 83*c* severally display a color corresponding to the attribute of each sheet of paper.

In the second embodiment, a description is given to the case of adopting "customer importance (sorting object 1), "delivery destination (sorting object 2)," and "sex (sorting object 3)" as sorting objects, and of using 〝最重要顧客 (meaning most important customer), 〃 〝重要顧客 (meaning important customer)," and 〝通常顧客 (meaning ordinary customer)" which indicate the "customer importance"; 〝東京 (meaning Tokyo)" and 〝大阪 (meaning Osaka)" which indicate the "delivery destination"; and 〝男性 (meaning male)" and 〝女性 (meaning female)" which indicate the "sex," as the attribute of each sheet of paper. The character forming image 82*a* and the identification image 83*a* express the attribute of the "customer importance"; the character forming image 82*b* and the identification image 83*b* express the attribute of the "delivery destination"; and the character forming image 82*c* and the identification image 83*c* express the attribute of the "sex."

The CPU 10 performs a sorting data generating process B (see FIG. 19) for generating the raster data of the character forming images 82*a*, 82*b*, and 82*c* and the identification images 83*a*, 83*b*, and 83*c* (hereinafter referred to as sorting data) in cooperation with the sorting data generating program 33. The sorting data generated by the sorting data generating process B is stored in the sorting data storing section 22 of the RAM 20.

In the second embodiment, a code generating job includes a sorting correspondence table 93 shown in FIG. 15 and sorting information 94 shown in FIG. 16.

The sorting correspondence table 93 associates attribute codes, display colors, and display character strings with one another for every attribute of each sheet of paper as to each of a plurality of sorting objects as shown in FIG. 15. For example, when the attribute of a sheet of paper is the 〝最重要顧客 (meaning most important customer)" as to the sorting object 1 (customer importance), then the attribute code of the sheet of paper is "1"; the display color thereof is the "red"; and the display character string thereof is the 〝最重要顧客 (meaning most important customer)."

The sorting information 94 is the information for associating a plurality of attribute codes (attributes) with each of the processing pages for every plurality of sorting objects as shown in FIG. 16, and the sorting information 94 is previously set in a code generating job. In the example shown in FIG. 16, the customer importance, delivery destination, and sex of a first page are the 〝重要 顧客 (meaning important customer), 〃 〝東京 (meaning Tokyo)," and the 〝女性 (meaning female)," respectively. The customer importance, delivery destination, and sex of a second page are the 〝通常顧客 (meaning ordinary customer),〃 〝大阪 (meaning Osaka)," and the 〝男性 (meaning male)," respectively.

Incidentally, when each piece of content of variable printing includes attribute information, then a corresponding attribute code may be specified on the basis of the attribute information. For example, it is conceivable that, when a certain piece of content includes text information indicating a "customer's address" and the leading information of the "customer's address" is "Tokyo Metropolis," "Saitama Prefecture," or the like, that is one of the metropolis and districts in the Kanto area, then the attribute code of the sorting object 2 (delivery destination) is set to "1," and that, when the leading information is "Osaka Prefecture," "Kyoto Prefecture," or the like, that is one of the metropolis and districts in the Kansai area, then the attribute code of the sorting object 2 (delivery destination) is set to "2."

The image forming apparatus of the second embodiment is provided with a page counter to indicate the order of an appeared page for every attribute of each of the sorting objects, and a line counter to be incremented by one for every 100 values of the page counter. The page counter and line counter of the attribute corresponding to the attribute code j of a sorting object i are denoted by a page counter ij and a line counter ij, respectively. For example, a page counter for the "最重要顧客 (meaning most important customer)" corresponding to an attribute code 1 of the sorting object 1 (customer importance) is a page counter 11.

Next, the operation of the second embodiment is described.

Figure 17:
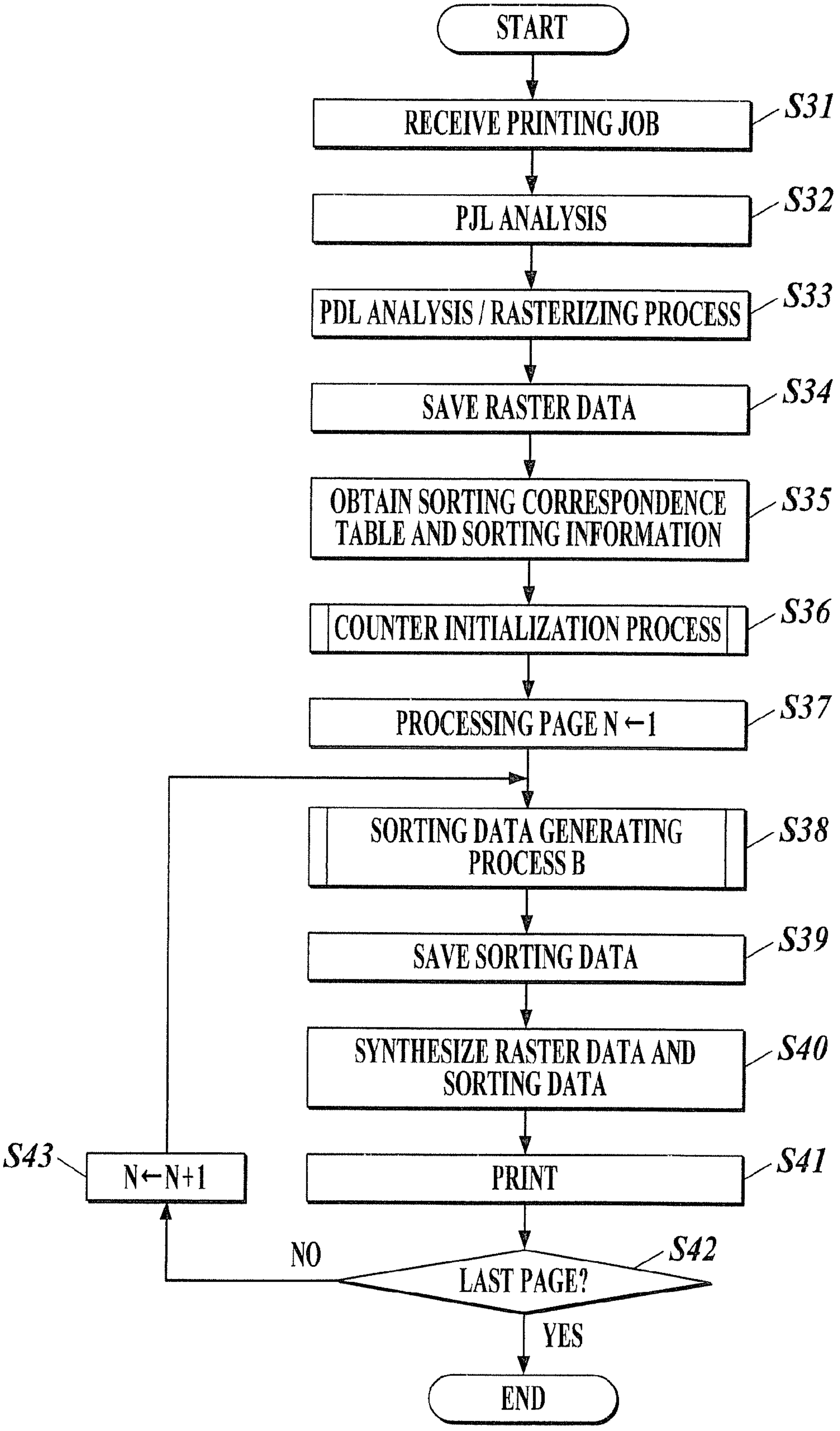
FIG. 17 is a flow chart showing a second variable printing process executed by the image forming apparatus of the second embodiment.

FIG. 17 is a flow chart expressing a second variable printing process executed in the image forming apparatus of the second embodiment. The second variable printing process is realized by a software process in cooperation with the CPU 10 and the programs stored in the ROM 30 (main control program 31, RIP processing program 32, sorting data generating program 33, and synthetic processing program 34).

First, when the communication section 50 of the image forming apparatus of the second embodiment receives a printing job through a network (Step S31), the CPU 10 analyzes the PJL data included in the ordinary job of the printing job (Step S32).

Next, the CPU 10 analyzes the PDL data and performs a rasterizing process to generate the raster data of the printing image 81 of each page (Step S33). The CPU 10 saves the raster data of the printing image 81 generated by the rasterizing process in the raster data storing section 21 of the RAM 20 (Step S34).

Next, the CPU 10 obtains the sorting correspondence table 93 and the sorting information 94 from the code generating job of the printing job received through the network (Step S35).

Next, the CPU 10 performs a counter initialization process (Step S36).

Figure 18:
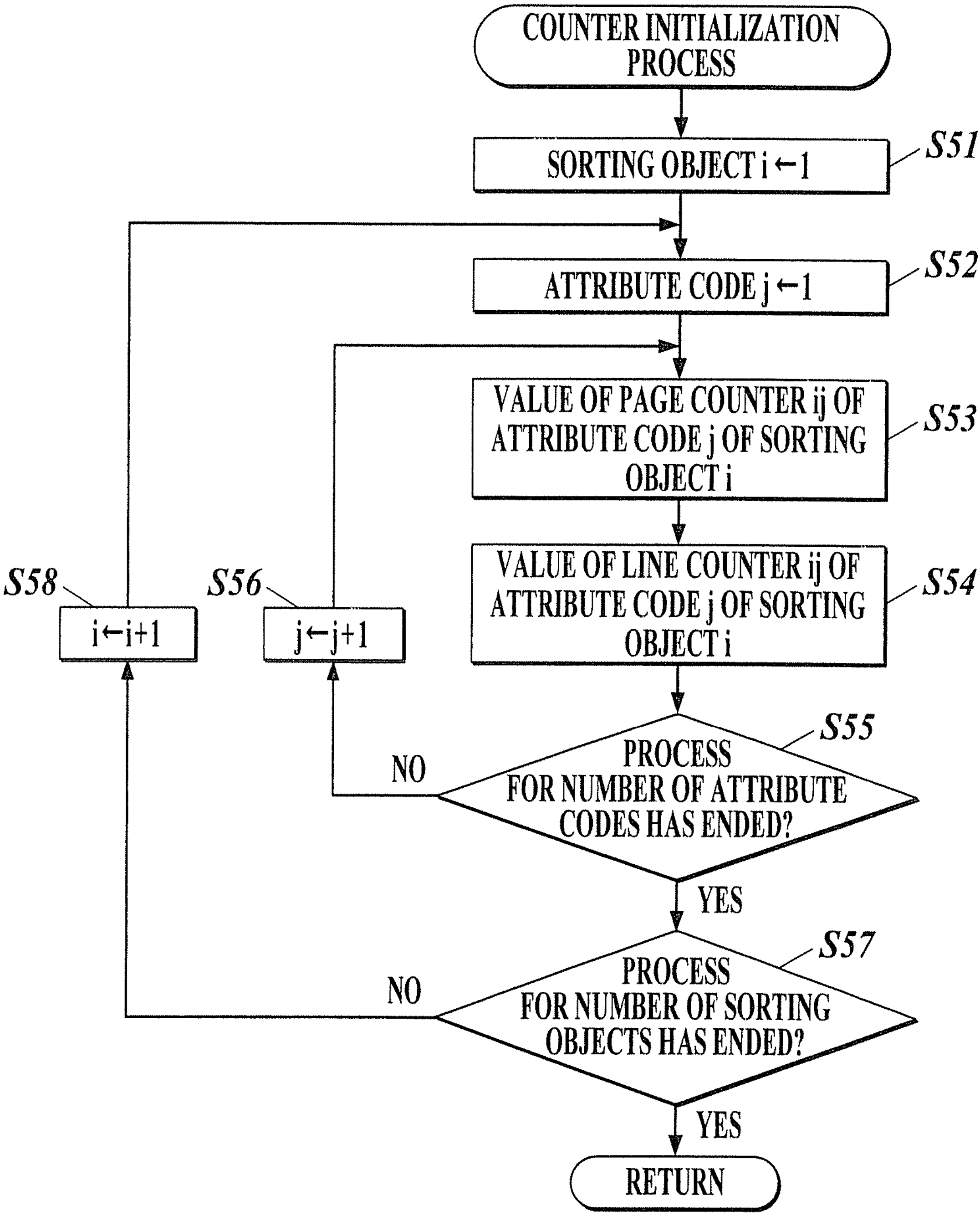
FIG. 18 is a flow chart showing a counter initialization process.

The counter initialization process is described here with reference to FIG. 18.

First, the CPU 10 sets the sorting object i to one (Step S51) and sets the attribute code j to one (Step S52).

Next, the CPU 10 initializes the value of the page counter ij of the attribute corresponding to the attribute code j of the sorting object i to one (Step S53), and initializes the value of the line counter ij of the attribute corresponding to the attribute code j of the sorting object i to one (Step S54).

Next, the CPU 10 judges whether the processes for the number of attribute codes have ended or not (Step S55). When the processes for the number of the attribute codes have not ended yet as the result of the judgment (Step S55: NO), then the CPU 10 increments the attribute code j by one (Step S56), and returns the process to Step S53 to repeat the process from Step S53 to Step S55 as to the next attribute code j.

When the processes for the number of the attribute codes have ended at Step S55 (Step S55: YES), then the CPU 10 judges whether the processes for the number of the sorting objects have ended or not (Step S57). When the processes for the number of the sorting objects have not ended as the result of the judgment (Step S57: NO), then the CPU 10 increments the sorting object i by one (Step S58), and returns the process to Step S52 to repeat the process from Step S52 to Step S57 of the next sorting object i.

When the processes for the number of the sorting objects have ended at Step S57 (Step S57: YES), then the counter initialization process ends.

Next, as shown in FIG. 17, the CPU 10 sets the processing page N to one (Step S37), and performs the sorting data generating process B (Step S38).

Figure 19:
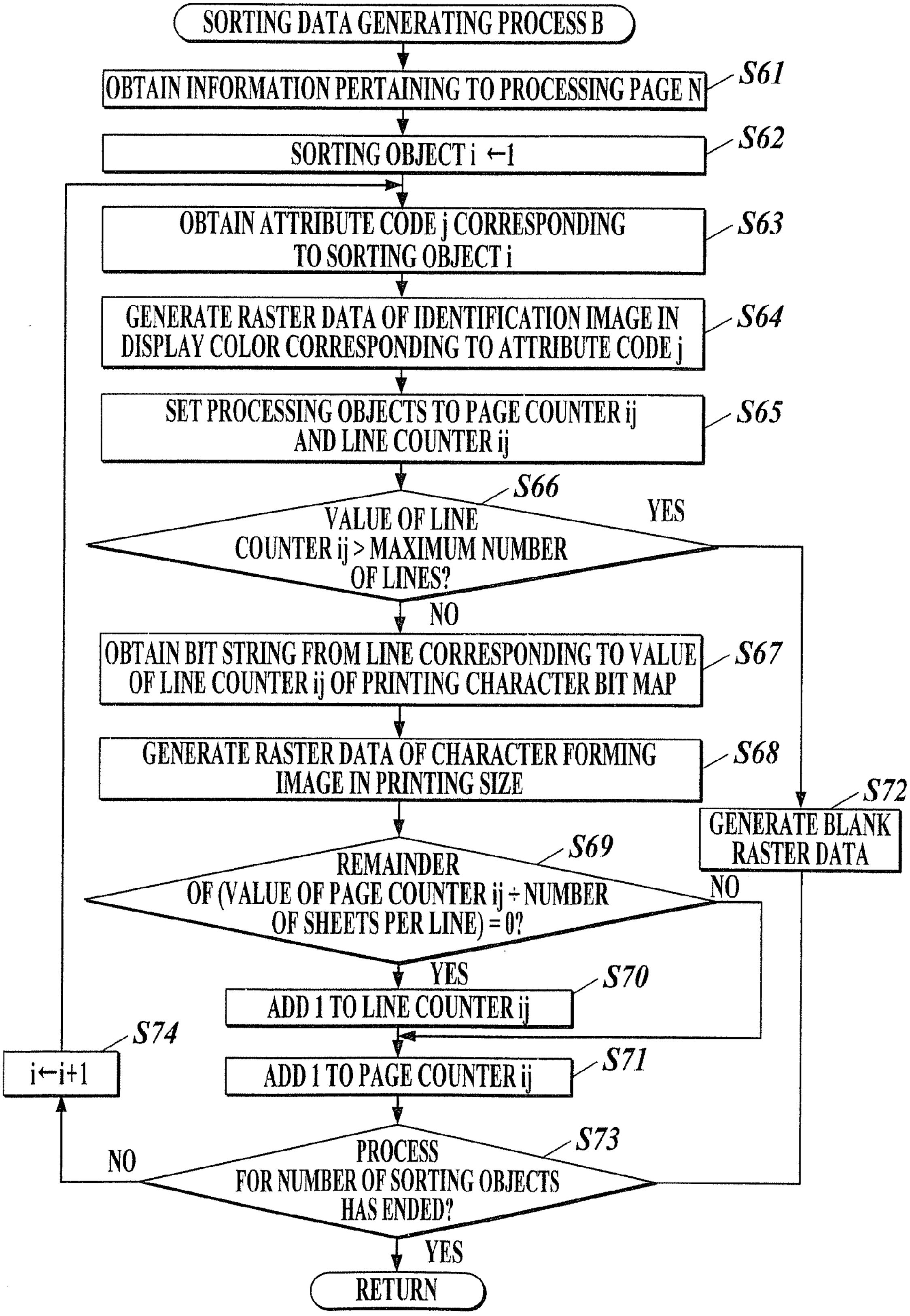
FIG. 19 is a flow chart showing a sorting data generating process B.

The sorting data generating process B is described here with reference to FIG. 19.

First, the CPU 10 obtains the information pertaining to the processing page N from the sorting information 94 (Step S61), and sets the sorting object i to one (Step S62).

Next, the CPU 10 obtains the attribute code j corresponding to the sorting object i from the information pertaining to the processing page N (Step S63).

Next, the CPU 10 referrers to the sorting correspondence table 93 to generate the raster data of the identification image 83*a*, 83*b*, or 83*c* corresponding to the sorting object i in the display color corresponding to the attribute code j of the sorting object i (Step S64). To put it concretely, when the sorting object i is "1," then the raster data of the identification image 83*a* is generated; when the sorting object i is "2," then the raster data of the identification image 83*b* is generated; and when the sorting object i is "3," then the raster data of the identification image 83*c* is generated.

Next, the CPU 10 sets the processing objects to the page counter ij and line counter ij of the attribute corresponding to the attribute code j of the sorting object i (Step S65).

Next, the CPU 10 judges whether the value of the line counter ij is larger than the maximum number of lines (16) or not (Step S66). When the value of the line counter ij is equal to or less than the maximum number of lines as the result of the judgment (Step S66: NO), then the CPU 10 obtains bit strings from the line corresponding to the value of the line counter ij of the bit map of the printing characters (Step S67) to generate the raster data of the character forming image 82*a*, 82*b*, or 82*c* corresponding to the sorting object i in the printing size (Step S68). To put it concretely, when the sorting object i is "1," then the raster data of the character forming image 82*a* is generated; when the sorting object i is "2," then the raster data of the character forming image 82*b* is generated; and when the sorting object i is "3," then the raster data of the character forming image 82*c* is generated.

Next, the CPU 10 judges whether the remainder of the division of the value of the page counter ij by the number of sheets (100) per line is zero or not (Step S69). When the remainder of the division of the value of the page counter ij by the number of sheets per line is zero as the result of the judgment (Step S69: YES), that is, when the value of the page counter ij can be divided by 100, then the CPU 10 adds one to the value of the line counter ij (Step S70).

After the processing at Step S70, or when the remainder of the division of the value of the page counter ij by the number of sheets per line is not zero (Step S69: NO), that is, when the value of the page counter ij cannot be divided by 100, then the CPU 10 adds one to the value of the page counter ij (Step S71).

When the value of the line counter ij is larger than the maximum number of the lines at Step S66 (Step S66: YES), then the CPU 10 generates the raster data in which the region of the character forming image 82*a*, 82*b*, or 82*c* corresponding to the sorting object i is blank (Step S72). To put it concretely, when the sorting object i is "1," then the CPU 10 generates the raster data in which the region of the character forming image 82*a* is blank; when the sorting object i is "2," then the CPU 10 generates the raster data in which the region of the character forming image 82*b* is blank; and when the sorting object i is "3," then the CPU 10 generates the raster data in which the region of the character forming image 82*c* is blank.

After the process at Step S71 or Step S72, the CPU 10 judges whether the processes for the number of the sorting objects have ended or not (Step S73). When the processes for the number of the sorting objects have not ended as the result of the judgment (Step S73: NO), then the CPU 10 increments the sorting object i by one (Step S74), and returns the process to Step S63 to repeat the process from the Step S63 to Step S73 as to the next sorting object i.

When the processes for the number of the sorting objects have ended at Step S73 (Step S73: YES), then the sorting data generating process B ends.

In this manner, the raster data of the identification images 83*a*, 83*b*, and 83*c* and the raster data of the character forming images 82*a*, 82*b*, and 82*c*, or the raster data of the identification images 83*a*, 83*b*, and 83*c* and the raster data of the blanks, are generated as the sorting data.

Next, as shown in FIG. 17, the CPU 10 saves the sorting data generated by the sorting data generating process B in the sorting data storing section 22 (Step S39).

Next, the CPU 10 synthesizes the raster data of the printing image 81 of the processing page N, which raster data has been saved at Step S34, and the sorting data saved at Step S39 together (Step S40). The raster data of the character forming images 82*a*, 82*b*, and 82*c* is synthesized at the positions different from one another in the end of each sheet of paper of the raster data of the printing image 81, and the raster data of the identification images 83*a*, 83*b*, and 83*c* is synthesized at the positions different from those where the character forming images 82*a*, 82*b*, and 82*c* are printed in the end of each sheet of paper of the raster data of the printing image 81. Then, the printing section 60 performs the printing on the basis of the data of the synthesized images (Step S41).

Next, the CPU 10 judges whether the printed page is the last page or not (Step S42). When the printed page is not the last page (Step S42: NO), then the CPU 10 increments the processing page N by one (Step S43), and returns the process to Step S38 to perform the processing of the next processing page N.

On the other hand, when the printed page is the last page (Step S42: YES), then the second variable printing process ends.

Figure 20:
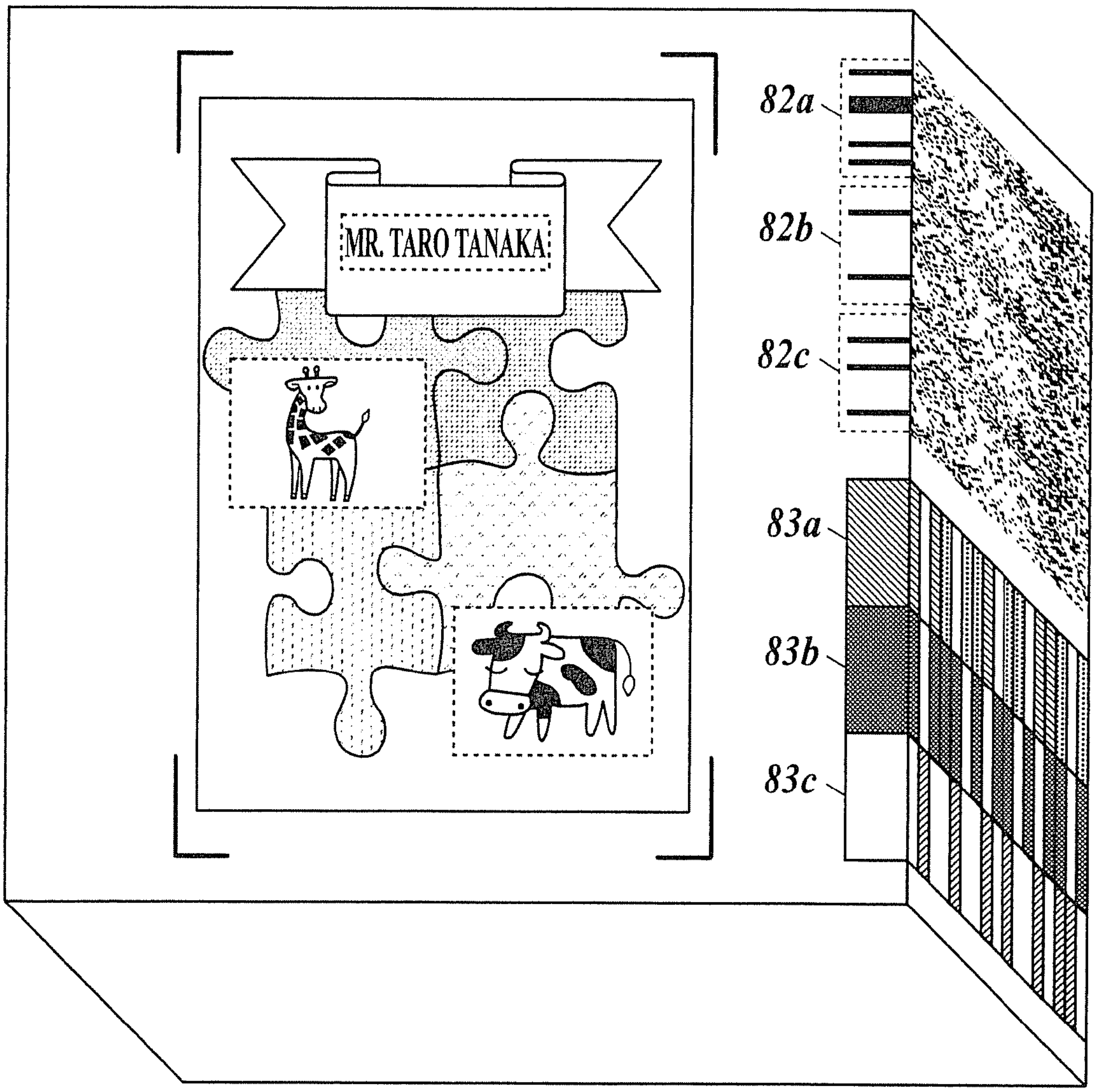
FIG. 20 is a perspective view showing the case of laying a sheet of paper just after printing on the top of the other sheets of paper in the order of printing.

FIG. 20 shows an example of the case of laying a sheet of paper just after printing on the top of the other sheets of paper in the order of printing. A random pattern is formed on a side face of the paper bundle by the character forming images 82*a*, 82*b*, and 82*c* printed on each sheet of paper. When each sheet of paper is sorted according to an attribute, a person or a sensor capable of identifying colors performs the sorting on the basis of the colors of the identification images 83*a*, 83*b*, and 83*c*. To put it concretely, when the sorting object is the "customer importance," then when the color of the identification image 83*a* is "red," then the sorting is performed to the "最重要顧客 (meaning most important customer)"; when the color is "green," then the sorting is performed to the "重要顧客 (meaning important customer)"; and when the color is "white," then the sorting is performed to the "通常顧客 (meaning ordinary customer)." Moreover, when the sorting object is the "delivery destination," then when the color of the identification image 83*b* is "blue," then the sorting is performed to "東京 (meaning Tokyo)"; and when the color is "white," then the sorting is performed to "大阪 (meaning Osaka)." Moreover, is the sorting object is the "sex," then when the color of the identification image 83*c* is "yellow," then the sorting is performed to the "男性 (meaning male)"; and when the color is "white," then the sorting is performed to the "女性 (meaning female)."

Figure 21:
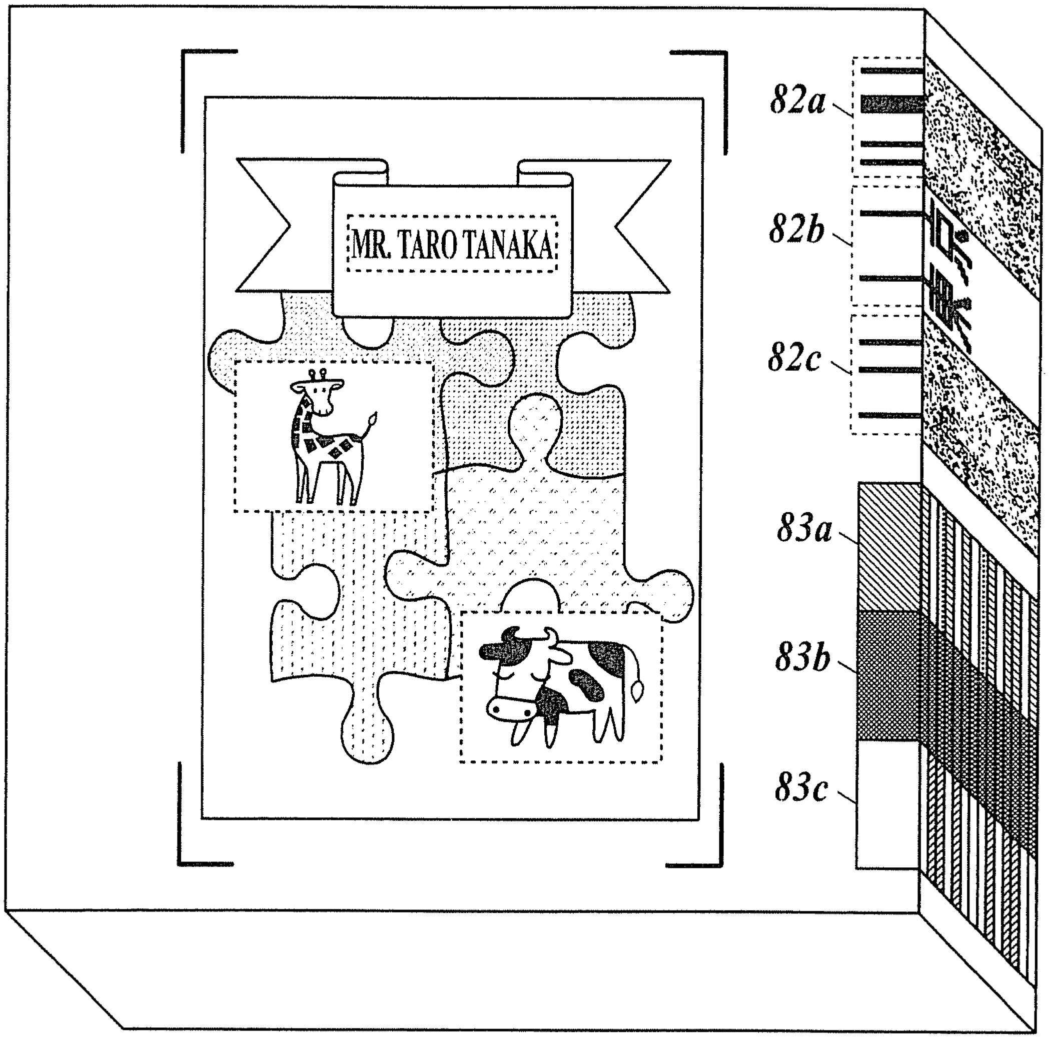
FIG. 21 is a perspective view showing the case of sorting the sheets of paper having the attribute of "東京 (meaning Tokyo)" by laying a sheet of paper on the top of the other sheets of paper in the order of printing.

FIG. 21 shows an example of the case of laying a sheet of paper having the attribute "東京 (meaning Tokyo)" on the top of the sheets of paper having the attribute "東 京 (meaning Tokyo)" in the order of printing. Characters of "東京 (meaning Tokyo)" are formed on a side face of the paper bundle by the character forming image 82*b* printed on each sheet of paper.

Figure 22A:
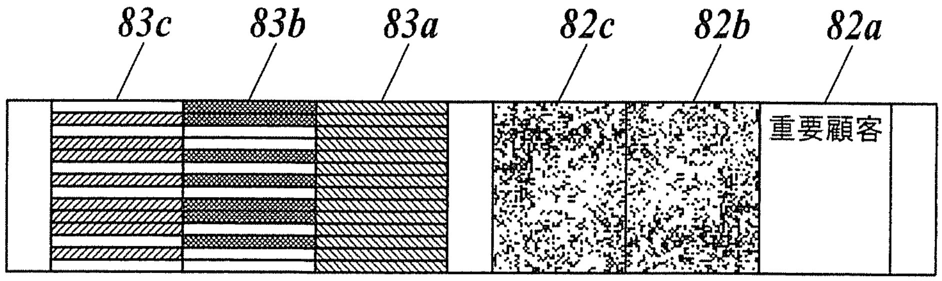
FIG. 22A is a side view showing a side face of a paper bundle sorted by laying a sheet of paper having the attribute of "重要顧客 (meaning important customer)" on the top of the other sheets of paper having the attribute of the "重要顧客 (meaning important customer)" in the order of printing.
Figure 22B:
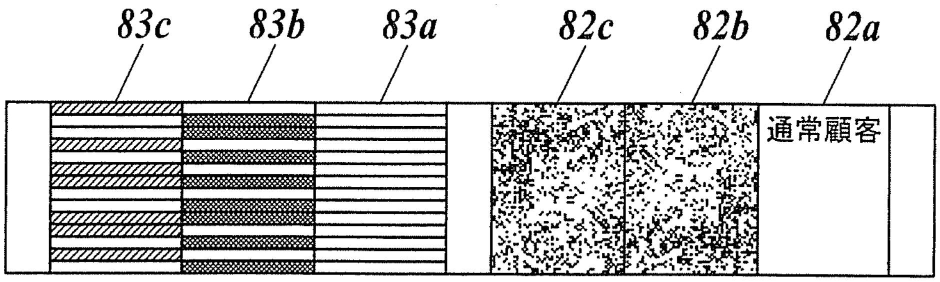
FIG. 22B is a side view showing a side face of a paper bundle sorted by laying a sheet of paper having the attribute of "通常顧客 (meaning ordinary customer)" on the top of the other sheets of paper having the attribute of the "通常顧客 (meaning ordinary customer)" in the order of printing.

FIGS. 22A and 22B are side views showing side faces of paper bundles sorted on the basis of customer importance. FIG. 22A shows an example of sorting sheets of paper by laying a sheet of paper having the attribute "重要顧客 (meaning important customer)" on the top of the sheets of paper having the attribute "重要顧客 (meaning important customer)" in the order of printing, and FIG. 22B is an example of sorting sheets of paper by laying a sheet of paper having the attribute "通常顧客 (meaning ordinary customer)" on the top of the sheets of having the attribute "通常顧客 (meaning ordinary customer)" in the order of printing. The characters of the "重要顧客 (meaning important customer)" and the "通常顧客 (meaning ordinary customer)" are formed on the side faces of the paper bundles by the character forming images 82*a* printed on each sheet of paper, respectively.

Figure 23A:
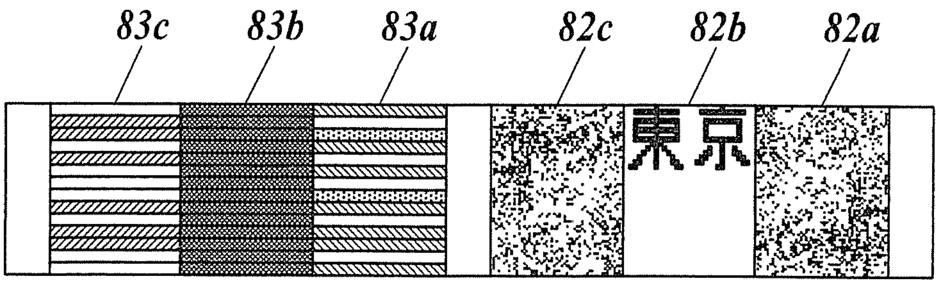
FIG. 23A is a side view showing a side face of a paper bundle sorted by laying a sheets of paper having the attribute of "東京 (meaning Tokyo)" on the top of the other sheets of paper having the attribute of "東京 (meaning Tokyo)" in the order of printing.
Figure 23B:
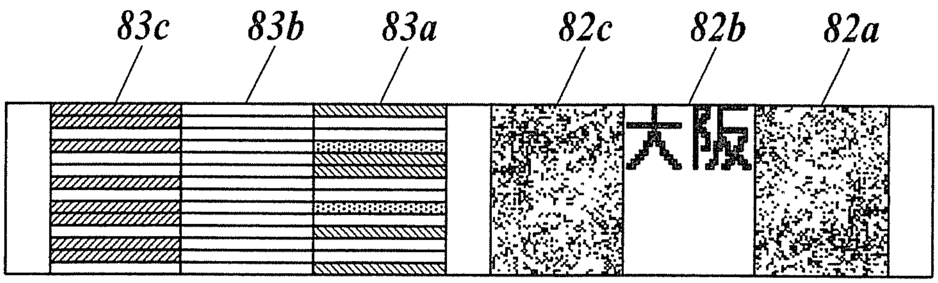
FIG. 23B is a side view showing a side face of a paper bundle sorted by laying a sheet of paper having the attribute of "大阪 (meaning Osaka)" on the top of the other sheets of paper having the attribute of "大阪 (meaning Osaka)" in the order of printing.

FIG. 23A and FIG. 23B are side views showing side faces of paper bundles sorted on the basis of delivery destinations. FIG. 23A shows an example of sorting sheets of paper by laying a sheet of paper having the attribute "東京 (meaning Tokyo)" on the top of the sheets of paper having the attribute "東京 (meaning Tokyo)" in the order of printing, and FIG. 23B is an example of sorting sheets of paper by laying a sheet of paper having the attribute "大阪 (meaning Osaka)" on the top of the sheets of having the attribute "大阪 (meaning Osaka)" in the order of printing. The characters of the "東京 (meaning Tokyo)" and the "大阪 (meaning Osaka)" are formed on the side faces of the paper bundles by the character forming images 82*b* printed on each sheet of paper, respectively.

As described above, according to the image forming apparatus of the second embodiment, when sheets of paper are sorted by every attribute, then the characters expressing the attribute are formed on a side face of the paper bundle of each of the sorted attributes by the character forming images 82*a*, 82*b*, and 82*c* printed on each sheets of paper, and consequently it becomes possible to judge the attribute of the sheets of paper easily.

Moreover, since the identification images 83*a*, 83*b*, and 83*c* of the colors corresponding to the respective attributes are printed at the end of each sheet of paper, a plurality of sheets of paper can be easily sorted by every attribute on the basis of the colors of the identification images 83*a*, 83*b*, and 83*c*. For example, when a client of printing requests the sorting according to a specific sorting object at the time of the end of printing, then the sorting can be performed in accordance with the colors of the identification images 83*a*, 83*b*, or 83*c* corresponding to the requested sorting object.

Moreover, by previously printing the character forming images 82*a*, 82*b*, and 82*c* corresponding to the attribute of each sheet of paper on the sheets of paper for every plurality of sorting objects, it becomes possible to judge the attributes of the sheets of paper easily even when sorting is performed on the basis of any sorting object. For example, when a client requests the enclosure of a “free invitation card” and a “specific service ticket” in direct mail to “最重要顧客 (meaning most important customer)” and “重要顧客 (meaning important customer),” respectively, in printing and enclosing business of certain direct mail although the schedule of the business was to perform the sorting by the delivery destination (sorting object 2) at the beginning (see FIGS. 23A and FIG. 23B), then it becomes possible to perform the sorting not to every delivery destination but to every customer importance (sorting object 1) (see FIGS. 22A and 22B).

Incidentally, the description of the each embodiment mentioned above concerns only an example of the image forming apparatus of the present invention, and the present invention is not limited to the description. Also as to the configurational details and operational details of each component constituting the image forming apparatus can be suitably changed without departing from the sprit and scope of the present invention.

Although the descriptions have been given to the cases of slicing the characters expressing the attribute of each sheet of paper in the lateral direction at the intervals corresponding to the thicknesses of 100 sheets of paper as the character forming images 82, 82*a*, 82*b*, and 82*c* in the respective embodiments mentioned above, the direction and intervals of slicing can be arbitrarily changed.

Although the examples of using the ROMs 30 as the computer readable media storing the programs for executing the respective processes have been disclosed in the above descriptions, the computer readable media are not limited to the ROMs 30. As the other computer readable media, a nonvolatile memory, such as a flash memory, and a portable recording media, such as a compact disc read only memory (CD-ROM), can be applied. Moreover, as a medium to provide the data of a program through a communication line, a carrier wave may be applied.

According to one aspect of the preferred embodiments of the present invention, there is provided an image forming method, comprising:

printing a character forming image in an end part of each sheet of a plurality of sheets of paper which are to be sorted by an attribute, in an order of slicing a character which expresses the attribute of each sheet, based on what number sheet of paper is each sheet among a paper group which is sorted by the same attribute, the character forming image being obtained by sequentially slicing the character in a previously determined direction at a previously determined interval.

When sheets of paper are sorted by every attribute, then the characters expressing the attribute are formed by the character forming images printed on the respective sheets of paper in the present image forming method, and consequently the attribute of the sheets of paper can be easily judged.

Preferably, in the image forming method, the previously determined interval corresponds to a thickness of one or a plurality of sheets of paper.

When sheets of paper are sorted by every attribute, the characters indicating the attribute can be formed by the thickness of a sheet of paper or a plurality of sheets of paper as a unit, by the present image forming method.

Preferably, the image forming method further comprises:

printing an identification image of a color corresponding to the attribute of each sheet in the end part of each sheet at a position which differs from where the character forming image is printed.

A plurality of sheets of paper can be easily sorted by every attribute on the basis of the colors of identification images by the present image forming method.

Preferably, the image forming method further comprises:

previously setting a plurality of attributes each corresponding to a sorting object for each sheet; and printing a plurality of character forming images corresponding to each attribute among the plurality of attributes, in the end part of each sheet at positions which differ from each other.

By previously printing the character forming images corresponding to a plurality of attributes on sheets of paper for every plurality of sorting objects, the attribute of the sheets of paper can be easily judged even when sorting is performed in accordance with any of the sorting objects by the present image forming method.

According to another aspect of the preferred embodiments of the present invention, there is provided an image forming apparatus to print a printing image for each sheet of a plurality of sheets of paper which are to be sorted by an attribute, comprising:

a control section to synthesize a character forming image with the printing image, in an end part of each sheet of the plurality of sheets of paper, in an order of slicing a character which expresses the attribute of each sheet, based on what number sheet of paper is each sheet among a paper group which is sorted by the same attribute, the character forming image being obtained by sequentially slicing the character in a previously determined direction at a previously determined interval; and a printing section to print the synthesized image.

When sheets of paper are sorted by every attribute, then the characters expressing the attribute are formed by the character forming images printed on the respective sheets of paper in the present image forming method, and consequently the attribute of the sheets of paper can be easily judged.

Preferably, in the image forming apparatus, the previously determined interval corresponds to a thickness of one or a plurality of sheets of paper.

When sheets of paper are sorted by every attribute, the characters indicating the attribute can be formed by the thickness of a sheet of paper or a plurality of sheets of paper as a unit, by the present image forming method.

Preferably, in the image forming apparatus, the control section further synthesizes an identification image of a color corresponding to the attribute of each sheet with the printing image, in the end part of each sheet at a position which differs from where the character forming image is printed.

A plurality of sheets of paper can be easily sorted by every attribute on the basis of the colors of identification images by the present image forming method.

Preferably, in the image forming apparatus, a plurality of attributes each corresponding to a sorting object for each sheet are previously set, and the control section synthesizes a plurality of character forming images corresponding to each attribute among the plurality of attributes with the printing image, in the end part of each sheet at positions which differ from each other.

By previously printing the character forming images corresponding to a plurality of attributes on sheets of paper for every plurality of sorting objects, the attribute of the sheets of paper can be easily judged even when sorting is performed in accordance with any of the sorting objects by the present image forming method.

The present U.S. patent application claims a priority under the Paris Convention of Japanese patent application No.

2007-296701 filed on Nov. 15, 2007, which shall be a basis of correction of an incorrect translation.

What is claimed is:

1. An image forming method for variable printing, comprising:

receiving, in an image forming apparatus, a print job for variable printing indicating two or more kinds of attributes;

associating, in the image forming apparatus, information regarding an attribute from the two or more kinds of attributes with variable print contents on a top surface of a sheet of paper such that sheets with like variable print contents are associated with the same attribute from the two or more kinds of attributes;

printing a character forming image of the attribute at a first position in a top-end part of each sheet of a plurality of sheets of paper, which are to be sorted by the attribute, by slicing a character that represents the attribute, based on a numerical position of the sheet of paper within a paper group sorted by the same attribute, wherein said character forming image for each sheet is obtained by sequentially slicing the character in a predetermined direction at a predetermined interval such that the plurality of sheets, when printed and stacked, displays, on a side-face of the printed stack of plurality of sheets, the character representing the attribute, for each of the two or more kinds of attributes.

2. The image forming method of claim 1, wherein the predetermined interval corresponds to a thickness of one or a plurality of sheets of paper.

3. The image forming method of claim 1, further comprising:

printing an identification image of a color corresponding to the attribute of each sheet in the end part of each sheet at a position which differs from where the character forming image is printed.

4. The image forming method of claim 1, further comprising:

establishing a plurality of attributes each corresponding to a sorting object for each sheet; and printing a plurality of character forming images corresponding to each attribute among the plurality of attributes, in the end part of each sheet at positions which differ from each other.

5. The image forming method of claim 1 further comprising:

printing an identification image corresponding to the attribute of each sheet at a second position in the end part of each sheet, wherein said identification image is different from said character forming image, and said second position of said identification image is different from said first position of said character forming image.

6. An image forming apparatus to print a printing image for each sheet of a plurality of sheets of paper which are to be sorted by an attribute, comprising:

a database for associating information on two or more kinds of attributes with respective variable print contents of the printing image of a sheet of paper such that sheets with like variable print contents are associated with the same attribute from the two or more kinds of attributes;

a processing unit to synthesize a character forming image of an attribute, indicated in a print job for variable printing, with the printing image, at a first position in a top-end part of each sheet of the plurality of sheets of paper, said character forming image being synthesized with said printing image by slicing a character, which represents the attribute, based on a numerical position of the sheet of paper within a paper group sorted by the same attribute, the character forming image for each sheet being obtained by sequentially slicing the character in a predetermined direction at a predetermined interval; and a printing section to print the synthesized image such that the plurality of sheets, when printed and stacked, displays, on a side-face of the printed stack of plurality of sheets, the character representing the attribute, for each of the two or more kinds of attributes.

7. The image forming apparatus of claim 6, wherein the predetermined interval corresponds to a thickness of one or a plurality of sheets of paper.

8. The image forming apparatus of claim 6, wherein the processing unit further synthesizes an identification image of a color corresponding to the attribute of each sheet with the printing image, in the end part of each sheet at a position which differs from where the character forming image is printed.

9. The image forming apparatus of claim 6, wherein a plurality of attributes each corresponding to a sorting object for each sheet are set in advance of image synthesis, and the processing unit synthesizes a plurality of character forming images corresponding to each attribute among the plurality of attributes with the printing image, in the end part of each sheet at positions which differ from each other.

10. The image forming apparatus of claim 6, wherein said printing section further prints an identification image synthesized by said processing unit and corresponding to the attribute at a second position in the end part of each sheet, said identification image being different from said character forming image, and said second position of said identification image being different from said first position of said character forming image.

11. A non-transitory computer readable medium having stored thereon a program, which causes a computer to perform the functions of:

receiving a print job for variable printing indicating two or more kinds of attributes;

associating information regarding an attribute from the two or more kinds of attributes with variable print contents on a top surface of a sheet of paper such that sheets with like variable print contents are associated with the same attribute from the two or more kinds of attributes;

printing a character forming image of the attribute at a first position in a top-end part of each sheet of a plurality of sheets of paper, which are to be sorted by the attribute, by slicing a character that represents the attribute, based on a numerical position of the sheet of paper within a paper group sorted by the same attribute, wherein said character forming image for each sheet is obtained by sequentially slicing the character in a predetermined direction at a predetermined interval such that the plurality of sheets, when printed and stacked, displays, on a side-face of the printed stack of plurality of sheets, the character representing the attribute, for each of the two or more kinds of attributes.

12. The non-transitory computer readable medium of claim 11, wherein the predetermined interval corresponds to a thickness of one or a plurality of sheets of paper.

13. The non-transitory computer readable medium of claim 11, wherein the program further causes the computer to perform the following function:

printing an identification image of a color corresponding to the attribute of each sheet in the end part of each sheet at a position which differs from where the character forming image is printed.

14. The non-transitory computer readable medium of claim 11, wherein the program further causes the computer to perform the following functions:

establishing a plurality of attributes each corresponding to a sorting object for each sheet; and printing a plurality of character forming images corresponding to each attribute among the plurality of attributes, in the end part of each sheet at positions which differ from each other.

15. The non-transitory computer readable medium of claim 11, wherein the program further causes the computer to perform the following function:

printing an identification image corresponding to the attribute of each sheet at a second position in the end part of each sheet, wherein said identification image is different from said character forming image, and said second position of said identification image is different from said first position of said character forming image.

* * * * *